(12) United States Patent
Fukaya

(10) Patent No.: US 6,731,359 B1
(45) Date of Patent: May 4, 2004

(54) COLOR FILTERS INCLUDING LIGHT SCATTERING FINE PARTICLES AND COLORANTS

(75) Inventor: Katsumi Fukaya, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/543,361

(22) Filed: Apr. 5, 2000

(30) Foreign Application Priority Data

Oct. 5, 1999 (JP) ............................................ 11-284028

(51) Int. Cl.$^7$ .............................................. G02F 1/1335
(52) U.S. Cl. ......................... 349/112; 349/64; 349/106
(58) Field of Search .............................. 349/112, 64, 106

(56) References Cited

U.S. PATENT DOCUMENTS

| | | | | |
|---|---|---|---|---|
| 5,724,111 A | * | 3/1998 | Mizobata et al. | 349/112 |
| 5,889,570 A | * | 3/1999 | Mitsui et al. | 349/113 |
| 5,949,506 A | * | 9/1999 | Jones et al. | 349/112 |
| 5,953,089 A | * | 9/1999 | Hiji et al. | 349/112 |
| 6,124,905 A | * | 9/2000 | Iijima | 349/62 |
| 6,144,430 A | * | 11/2000 | Kuo | 349/113 |
| 6,166,793 A | * | 12/2000 | Hayashi et al. | 349/113 |
| 6,224,223 B1 | * | 5/2001 | Higuchi et al. | 362/31 |
| 6,483,562 B1 | * | 11/2002 | Fukuyoshi et al. | 349/113 |

FOREIGN PATENT DOCUMENTS

| | | |
|---|---|---|
| JP | 4-194941 | 7/1992 |
| JP | 7-28055 | 1/1995 |
| JP | 10-333133 | 12/1998 |
| JP | 11-23813 | 1/1999 |
| JP | 11-84360 | 3/1999 |
| JP | 11-271746 | 10/1999 |
| JP | 11-323196 | 11/1999 |

* cited by examiner

Primary Examiner—Toan Ton
Assistant Examiner—Andrew Schechter
(74) Attorney, Agent, or Firm—Parkhurst & Wendel, L.L.P.

(57) ABSTRACT

Color filters are provided which can realize reflection or semi-transmission color liquid crystal display devices having high luminance and excellent color properties. This color filter comprises at least a substrate and a colored layer of a plurality of color patterns, and includes light scattering fine particles and has a haze of 10 to 90. The inclusion of the light scattering fine particles within the color filter can impart a light scattering function to the color filter per se. This can eliminate the need to provide a front scattering plate on the color filter (in its viewer side). Further, a deterioration in color properties caused by light scattering can be surely compensated for by the color property correction of the colored layer per se and/or by the correction of color properties through the addition of a colorant. This is suitable for surely preventing a deterioration in color properties of the color filter per se.

19 Claims, 10 Drawing Sheets

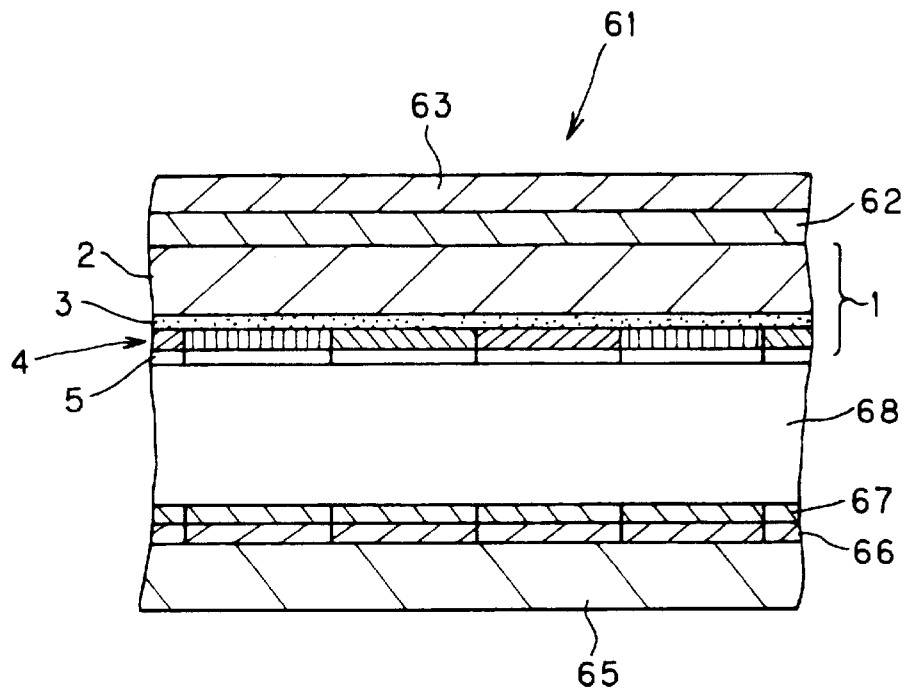
F I G. 7
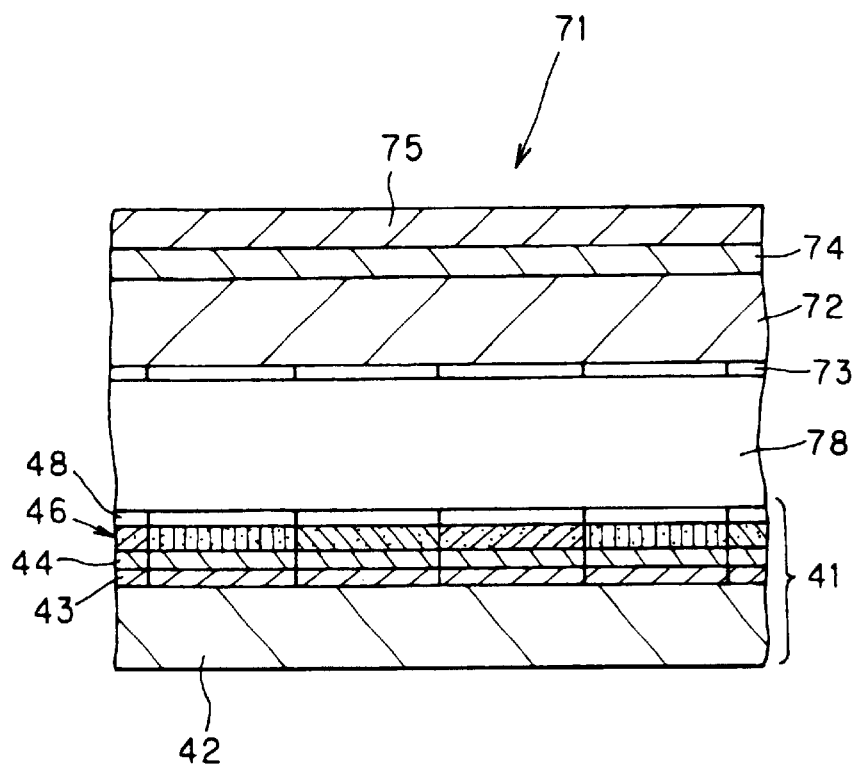
F I G. 8

COLOR FILTERS INCLUDING LIGHT SCATTERING FINE PARTICLES AND COLORANTS

BACKGROUND OF THE INVENTION

1. Field of the Invention

The present invention relates to color filters, and more particularly to color filters for reflection or semi-transmission liquid crystal display devices.

2. Background Art

In recent years, attention has been drawn to color liquid crystal display devices as flat displays. Color liquid crystal display devices may be classified into reflection type and transmission type. Reflection color liquid crystal display devices have the following structure. For example, a color filter comprising a colored layer of a plurality of colors (in general, the three primary colors of red (R), green (G), and blue (B)) (and optionally a black matrix and a flattening layer) and a transparent conductive layer is provided so as to face a TFT array substrate having a reflective electrode layer made of a metal, such as aluminum, and a thin film transistor (TFT element), while leaving a predetermined gap between the color filter and the TFT array substrate, and a liquid crystal layer is provided within the gap. A phase difference plate, a polarizing plate, and a front scattering plate are provided on the color filter (in its viewer side). The front scattering plate has the function of scattering light, and is provided for properly scattering light incident on the reflection liquid crystal display device to ensure satisfactory visibility.

Due to the presence of the front scattering plate, however, the conventional reflection color liquid crystal display devices unfavorably suffer from problems of lowered luminance and lowered color properties. This is attributable to the coloring of the front scattering plate. The presence of the front scattering plate poses an additional problem of a parallax (unsharp image). The lowered luminance is unavoidable in the conventional reflection color liquid crystal display devices wherein the front scattering plate is provided on the color filter (in its viewer side). On the other hand, the lowered color properties can be prevented by performing the correction of color properties on a level corresponding to the coloring of the front scattering plate in the color filter. When the color filter is produced by a process which is different from the production process of the liquid crystal display device, however, it is not easy to properly correct color properties of the color filter.

SUMMARY OF THE INVENTION

The present invention has been made under the above circumstances, and it is an object of the present invention to provide a color filter which can realize reflection or semi-transmission color liquid crystal display devices having high luminance and excellent color properties.

In order to attain the above object, according to one aspect of the present invention, there is provided a color filter comprising at least a substrate and a colored layer of a plurality of color patterns, said color filter including light scattering fine particles and having a haze of 10 to 90.

In the color filter according to a first embodiment as a preferred embodiment of the present invention, the substrate is transparent, and the color filter further comprises a transparent electrode layer stacked on the colored layer in its surface remote from the substrate, the light scattering fine particles being included as a light scattering layer between the transparent substrate and the colored layer.

In the color filter according to a second embodiment as a preferred embodiment of the present invention, the substrate is transparent, and the color filter further comprises a transparent electrode layer stacked on the colored layer in its surface remote from the substrate, the light scattering fine particles being contained in the colored layer.

In the color filter according to a third embodiment as a preferred embodiment of the present invention, the substrate is transparent, and the color filter further comprises a flattening layer stacked on the colored layer in its surface remote from the substrate and a transparent electrode layer stacked on the flattening layer in its surface remote from the colored layer, the light scattering fine particles being contained in the flattening layer.

In the color filter according to a fourth embodiment as a preferred embodiment of the present invention, a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being included as a light scattering layer between the reflective electrode layer and the colored layer.

In the color filter according to a fifth embodiment as a preferred embodiment of the present invention, a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being contained in the colored layer.

In the color filter according to a sixth embodiment as a preferred embodiment of the present invention, the color filter further comprises a flattening layer stacked on the colored layer in its surface remote from the substrate, and a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being contained in the flattening layer.

In the color filter according to a seventh embodiment as a preferred embodiment of the present invention, the substrate is transparent, and the color filter further comprises a transparent electrode layer stacked on the colored layer in its surface remote from the substrate, the light scattering fine particles being included as a light scattering layer between the transparent substrate and the colored layer and being further contained in at least one of the color patterns.

In the color filter according to an eighth embodiment as a preferred embodiment of the present invention, the substrate is transparent, and the color filter further comprises a flattening layer stacked on the colored layer in its surface remote from the substrate and a transparent electrode layer stacked on the flattening layer in its surface remote from the colored layer, the light scattering fine particles being contained in the flattening layer and at least one of the color patterns.

In the color filter according to a ninth embodiment as a preferred embodiment of the present invention, the substrate is transparent, and the color filter further comprises a flattening layer stacked on the colored layer in its surface remote from the substrate and a transparent electrode layer stacked on the flattening layer in its surface remote from the colored layer, the light scattering fine particles being included as a light scattering layer between the transparent substrate and the colored layer and being further contained in the flattening layer.

In the color filter according to a tenth embodiment as a preferred embodiment of the present invention, a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being included as a light scattering layer between the reflective electrode layer and the colored layer and being further contained in at least one of the colored patterns.

In the color filter according to an eleventh embodiment as a preferred embodiment of the present invention, the color filter further comprises a flattening layer stacked on the colored layer in its surface remote from the substrate, and a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being contained in the flattening layer and, in addition, in at least one of the color patterns.

In the color filter according to a twelfth embodiment as a preferred embodiment of the present invention, the color filter further comprises a flattening layer stacked on the colored layer in its surface remote from the substrate, and a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being included as a light scattering layer between the reflective electrode layer and the colored layer and being further contained in the flattening layer.

According to another aspect of the present invention, there is provided a liquid crystal display device comprising: the color filter according to any one of the first to third embodiments; an electrode substrate comprising a transparent substrate and, stacked on the transparent substrate in the following order, a driving element layer, a reflective electrode layer, and a transparent electrode layer, light scattering fine particles being included as a light scattering layer between the reflective electrode layer and the transparent electrode layer; and a liquid crystal layer sandwiched between the color filter and the electrode substrate.

According to still another aspect of the present invention, there is provided a liquid crystal display device comprising: the color filter according to any one of the fourth to sixth embodiments; a display-side substrate comprising a transparent electrode layer stacked on a transparent substrate, light scattering fine particles being included as a light scattering layer between the transparent substrate and the transparent electrode layer; and a liquid crystal layer sandwiched between the color filter and the display-side substrate.

According to a further aspect of the present invention, there is provided a color filter comprising at least a substrate and a colored layer of a plurality of color patterns, said color filter including light scattering fine particles and a colorant for correction of color properties.

According to the present invention, the inclusion of the light scattering fine particles within the color filter can impart a light scattering function to the color filter per se. This can eliminate the need to provide a front scattering plate on the color filter (in its viewer side). Further, a deterioration in color properties caused by light scattering can be surely compensated for by the color property correction of the color filter per se (for example, colored layer). This is suitable for preventing a deterioration in color properties of the color filter per se.

BRIEF DESCRIPTION OF THE DRAWINGS

FIG. 7 is a schematic longitudinal sectional view showing an embodiment of a reflection color liquid crystal display device using the color filter according to the present invention;

FIG. 8 is a schematic longitudinal sectional view showing another embodiment of a reflection color liquid crystal display device using the color filter according to the present invention;

DETAILED DESCRIPTION OF THE INVENTION

Color Filters According to First to Sixth Embodiments

According to the color filters according to the first to sixth embodiments of the present invention, light scattering fine particles are contained in only one of the layers in the color filter. Among these embodiments, the color filters according to the first to third embodiments are of such a type that is provided on a liquid crystal layer in its viewer side in a reflection color liquid crystal display device. The color filters according to the fourth to sixth embodiments are of such a type that is provided on a liquid crystal layer in its side remote from a viewer in a reflection color liquid crystal display device.

Color Filter According to First Embodiment

Figure 1:
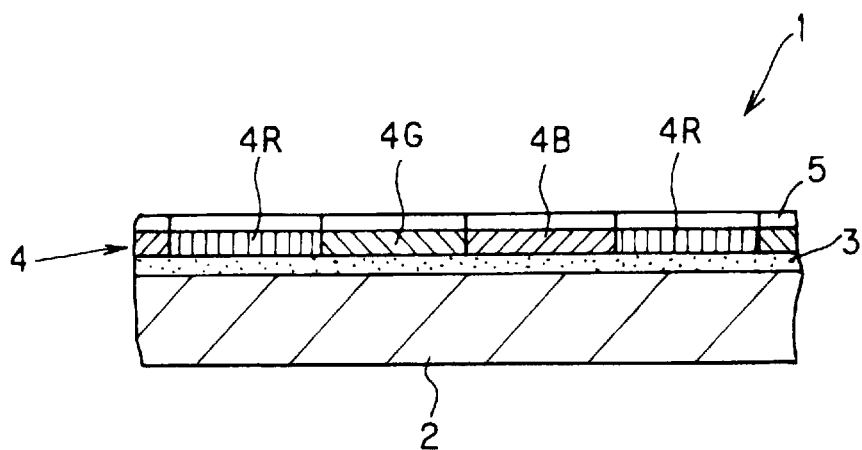
FIG. 1 is a schematic longitudinal sectional view showing one example of the color filter according to the first embodiment of the present invention.

FIG. 1 is a schematic longitudinal sectional view of the color filter according to the first embodiment of the present invention. A color filter 1 shown in FIG. 1 comprises: a transparent substrate 2; a light scattering layer 3 provided on the transparent substrate 2; and a colored layer 4 and a transparent electrode layer 5 stacked on the light scattering layer 3. The colored layer 4 consists of a red color pattern 4R, a green color pattern 4G, and a blue color pattern 4B.

In the color filter 1, nonflexible, transparent rigid materials, such as quartz glass, Pyrex glass, and synthetic quartz plates, or flexible, transparent materials, such as transparent resin films and optical resin plates, may be used as the transparent substrate 2.

In the color filter 1, the light scattering layer 3 functions to properly scatter light incident on a reflection liquid crystal display device, thereby ensuring satisfactory visibility. The light scattering layer 3 is formed of a light-transparent resin with fine particles capable of scattering light (in the specification, referred to also as "light scattering fine particles") dispersed therein.

Light-transparent resins include acrylic resin, epoxy resin, polyvinyl alcohol resin, polyimide resin, and vinyl ether resin. In consideration of the refractive index, the adhesion to the transparent substrate 2 and the colored layer 4 and the like, these resins may be used either solely or as a mixture of two or more.

Fine particles capable of scattering light include: fine particles of inorganic materials, such as silicon oxide, aluminum oxide, and barium sulfate; fine particles of organic materials, such as acrylic resins, divinylbenzene resins, benzoguanamine resins, styrene resins, melamine resins, acryl-styrene resins, polycarbonate resins, polyethylene resins, and polyvinyl chloride resins; and fine particles of a mixture of two or more types of the above inorganic and organic materials. Among them, melamine resins, benzoguanamine resins, mixtures of two or more of these resins, and copolymers of monomers constituting these resins are preferred from the viewpoints of transparency and durability. These fine particles may have an average particle diameter of 0.1 to 5.0 $\mu$m, preferably 0.1 to 4.0 $\mu$m, more preferably 0.1 to 2.0 $\mu$m. When the average particle diameter is less than 0.1 $\mu$m, the scattering effect cannot be substantially attained. The content of the fine particles in the light scattering layer 3 may be 0.5 to 70% by weight, preferably 1.0 to 50% by weight. The thickness of the light scattering layer 3 may be about 0.5 to 20 $\mu$m, preferably about 1.0 to 10 $\mu$m. The light scattering fine particles are preferably spherical from the viewpoint of enhancing the scattering effect.

In this case, in order to provide satisfactory intensity of light scattered by the light scattering layer 3, the haze [haze=(diffused light transmission)/(total light transmission)×100] should be increased. Increasing the content of the fine particles or the thickness of the light scattering layer is necessary for realizing high haze (high turbidity). In this case, a lowering in total light transmission and diffused light transmission is unfavorable. For example, when conventional fine particles of titanium oxide or calcium carbonate are used, increasing the content of the fine particles or the thickness of the light scattering layer leads to the development of light shielding properties of the particles, which significantly lowers the total light transmission. In the color filter 1 according to the present invention, the use of fine particles formed of the above materials in the light scattering layer 3 can realize a haze of 10 to 90, preferably 25 to 80, more preferably 30 to 70, a total light transmission of not less than 30%, and a diffused light transmission of not less than 10%. In the present invention, the haze is measured with a direct reading haze meter manufactured by Toyo Seiki Seisaku Sho, Ltd. In the system using a front scattering plate, parallax (unsharpness of image) increases with increasing the haze. By contrast, according to the present invention, by virtue of the inclusion of the light scattering layer in the color filter, the parallax does not occur even in the case of high haze.

The colored layer 4 may be formed by pigment dispersion, dyeing, electrodeposition and other conventional methods. Each of the color patterns (4R, 4G, 4B) may be arranged in a desired form such as stripe, mosaic, triangular, or four-pixel placement without particular limitation.

The transparent electrode layer 5 constituting the color filter 1 may be formed by a conventional film forming method, such as sputtering, vacuum deposition, or CVD (chemical vapor deposition), using indium tin oxide (ITO), zinc oxide (ZnO), tin oxide (SnO) or the like, or an alloy thereof. The thickness of the transparent electrode layer 5 is about 0.01 to 1 $\mu$m, preferably about 0.03 to 0.5 $\mu$m.

In the above color filter 1, even though there is coloring of the light scattering layer 3, the deterioration in color properties can be surely compensated for by the color property correction of the colored layer 4. Therefore, in a reflection color liquid crystal display device using the color filter 1 which has been produced by a process which is different from the production process of the liquid crystal display device, a deterioration in color properties attributable to light scattering does not substantially occur. Further, since the light scattering layer 3 is included within the color filter 1, there is no need to provide a front scattering plate which has been provided on the color filter (in its viewer side) in the conventional reflection color liquid crystal display device. Thus, a reflection color liquid crystal display device having high luminance can be realized. Further, by virtue of the light scattering layer 3, the adhesion between the transparent substrate 2 and the colored layer 4 can be further enhanced.

Color Filter According to Second Embodiment

Figure 2:
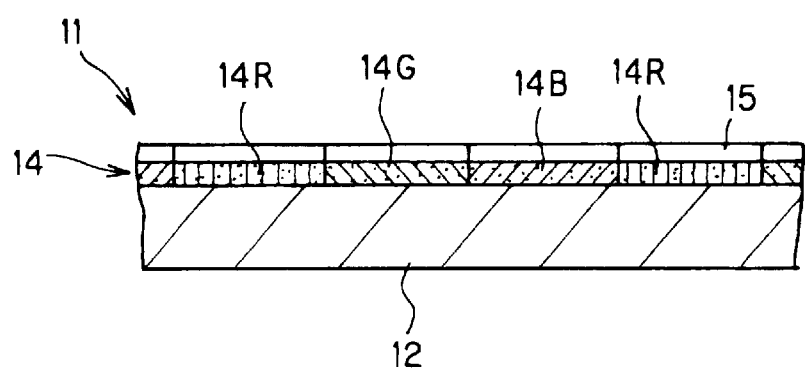
FIG. 2 is a schematic longitudinal sectional view showing one example of the color filter according to the second embodiment of the present invention.

FIG. 2 is a schematic longitudinal sectional view of the color filter according to the second embodiment of the present invention. A color filter 11 shown in FIG. 2 comprises: a transparent substrate 12; a light scattering colored layer 14 provided on the transparent substrate 12; and a transparent electrode layer 15 provided on the light scattering colored layer 14. The light scattering colored layer 14 consists of a red color pattern 14R, a green color pattern 14G, and a blue color pattern 14B.

In the color filter 11, the transparent substrate 12 and the transparent electrode layer 15 are respectively the same as the transparent substrate 2 and the transparent electrode layer 5 in the color filter 1, and, hence, the description thereof will be omitted.

In the color filter 11, the light scattering colored layer 14 has the same function as a colored layer in the conventional reflection color liquid crystal display device and, at the same time, functions to properly scatter light incident on a reflection liquid crystal display device, thereby ensuring satisfactory visibility.

The light scattering colored layer 14 is such that fine particles capable of scattering light have been dispersed in a colored layer formed by a conventional pigment dispersion, dyeing, electrodeposition or other method. The fine particles capable of scattering light include those described above in connection with the color filter 1. The content of the fine particles in the light scattering colored layer 14 may be 0.5 to 70% by weight, preferably 1.0 to 50% by weight. The thickness of the light scattering colored layer 14 may be 0.05 to 15 $\mu$m, preferably 0.5 to 15 $\mu$m, more preferably 0.5 to 10 $\mu$m.

Also in this color filter 11, the use of fine particles formed of the above materials in the light scattering colored layer 14 can realize a haze of 10 to 90, preferably 25 to 80, more preferably 30 to 70, a total light transmission of not less than 30%, and a diffused light transmission of not less than 10%. In the system using a front scattering plate, parallax (unsharpness of image) increases with increasing the haze. By contrast, according to the present invention, by virtue of the inclusion of the light scattering layer in the color filter, the parallax does not occur even in the case of high haze.

Each of the color patterns (14R, 14G, 14B) in the light scattering colored layer 14 may be arranged in a desired form such as stripe, mosaic, triangular, or four-pixel placement without particular limitation.

In the above color filter 11, even though color properties of the light scattering colored layer 14 with light scattering fine particles dispersed therein are different from color properties inherent in the colored layer, the change in color properties can be surely compensated for by the correction of color properties in the stage of production of the light scattering colored layer 14. Further, the level of light scattering can be closely regulated as desired for each color by regulating the content of the fine particles. Therefore, in a reflection color liquid crystal display device using the color filter 11 which has been produced by a process which is different from the production process of the liquid crystal display device, a deterioration in color properties attributable to light scattering does not substantially occur. Further, since the light scattering colored layer 14 is included within the color filter 11, there is no need to provide a front scattering plate which has been provided on the color filter (in its viewer side) in the conventional reflection color liquid crystal display device. Thus, a reflection color liquid crystal display device having high luminance can be realized.

Color Filter According to Third Embodiment

Figure 3:
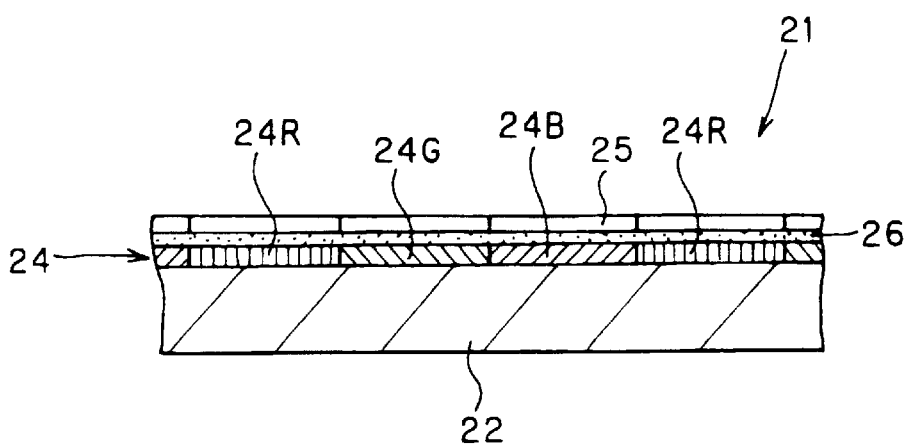
FIG. 3 is a schematic longitudinal sectional view showing one example of the color filter according to the third embodiment of the present invention.

FIG. 3 is a schematic longitudinal sectional view of the color filter according to the third embodiment of the present invention. A color filter 21 shown in FIG. 3 comprises: a transparent substrate 22; and, stacked on the transparent substrate 22 in the following order, a colored layer 24, a light scattering flattening layer 26, and a transparent electrode layer 25. The colored layer 24 consists of a red color pattern 24R, a green color pattern 24G, and a blue color pattern 24B.

In the color filter 21, the transparent substrate 22, the colored layer 24, and the transparent electrode layer 25 are respectively the same as the transparent substrate 2, the colored layer 4, and the transparent electrode layer 5 in the color filter 1, and, hence, the description thereof will be omitted.

In the color filter 21, the light scattering flattening layer 26 functions to eliminate fine irregularities on the surface of the colored layer 24, thereby forming a flat surface for the formation of a transparent electrode layer, and, at the same time, functions to properly scatter light incident on a reflection liquid crystal display device, thereby ensuring satisfactory visibility.

The light scattering flattening layer 26 is formed of, for example, a resin, such as an acrylic resin, an epoxy resin, a vinyl ether resin, a polyimide resin, or a propynyl resin, with fine particles capable of scattering light dispersed therein. In this case, the fine particles capable of scattering light may be those as described above in connection with the color filter 1. The content of the fine particles in the light scattering flattening layer 26 may be 0.5 to 70% by weight, preferably 1.0 to 50% by weight. The thickness of the light scattering flattening layer 26 may be about 0.5 to 20 $\mu$m, preferably about 1.0 to 10 $\mu$m.

Also in this color filter 21, the use of fine particles formed of the above materials in the light scattering flattening layer 26 can realize a haze of 10 to 90, preferably 25 to 80, more preferably 30 to 70, a total light transmission of not less than 30%, and a diffused light transmission of not less than 10%. In the system using a front scattering plate, parallax (unsharpness of image) increases with increasing the haze. By contrast, according to the present invention, by virtue of the inclusion of the light scattering layer in the color filter, the parallax does not occur even in the case of high haze.

In the above color filter 21, even though there is coloring of the light scattering flattening layer 26, the deterioration in color properties can be surely compensated for by the color property correction of the colored layer 24 in the stage of production of the color filter 21. Therefore, in a reflection color liquid crystal display device using the color filter 21 which has been produced by a process which is different from the production process of the liquid crystal display device, a deterioration in color properties attributable to light scattering does not substantially occur. Further, since the light scattering flattening layer 26 is included within the color filter 21, there is no need to provide a front scattering plate which has been provided on the color filter (in its viewer side) in the conventional reflection color liquid crystal display device. Thus, a reflection color liquid crystal display device having high luminance can be realized. Further, by virtue of improved strength attained by the provision of the light scattering flattening layer 26, the gap (thickness of the liquid crystal layer) can be more easily regulated by a spacer.

Color Filter According to Fourth Embodiment

Figure 4:
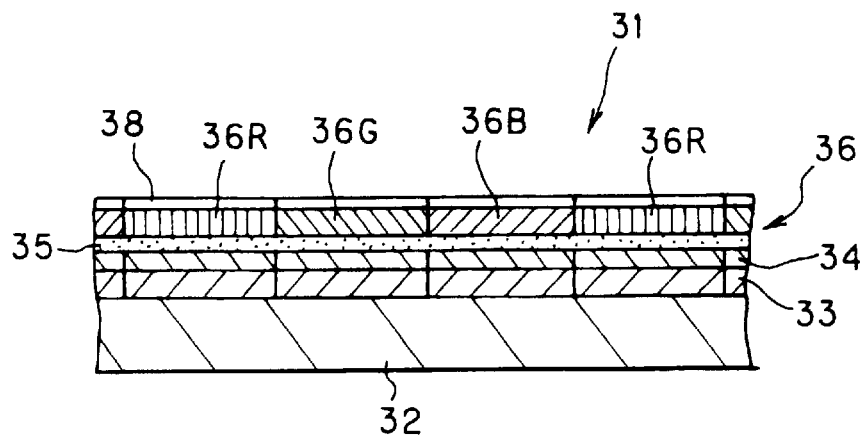
FIG. 4 is a schematic longitudinal sectional view showing one example of the color filter according to the fourth embodiment of the present invention.

FIG. 4 is a schematic longitudinal sectional view of the color filter according to the fourth embodiment of the present invention. A color filter 31 shown in FIG. 4 comprises: a driving element layer 33 provided on a substrate 32; and, stacked on the driving element layer 33 in the following order, a reflective electrode layer 34, a light scattering layer 35, a colored layer 36, and a transparent electrode layer 38. The colored layer 36 consists of a red color pattern 36R, a green color pattern 36G, and a blue color pattern 36B. The reflective electrode layer 34 conducts to the transparent electrode layer 38 for each color pattern.

In the color filter 31, substrates usable as the substrate 32 include various glass substrates, metallic substrates, resin substrates, and composite substrates of two or more of these substrates. The thickness of the substrate 32 may be properly determined by taking into consideration the applications of the color filter 31 and the like, and may be, for example, about 0.3 to 10 mm.

In the color filter 31, the driving element layer 33 comprises a thin film transistor (TFT) formed in a predetermined pattern and drain, source, and gate electrodes. The reflective electrode layer 34 is a pixel electrode which is connected to the drain electrode and provided on the driving element layer 33 through an insulating layer and has been planished. Further, when the color filter 31 is used in a semi-transmission color liquid crystal display device described later, the reflection electrode layer 34 may be a half mirror electrode layer or a perforated electrode layer. The reflective electrode layer 34 may be formed of a metallic thin layer of aluminum, chromium, gold, silver, copper or the like, and the thickness thereof may be 500 to 10,000 Å, preferably 1,000 to 3,000 Å. This reflective electrode layer 34 may be formed by a conventional thin film forming method, such as vapor deposition, sputtering, CVD, or ion plating.

In the color filter 31, the light scattering layer 35 functions to properly scatter light incident on a reflection liquid crystal display device, thereby ensuring satisfactory visibility. The light scattering layer 35 is formed of a light-transparent resin with fine particles capable of scattering light dispersed therein.

Light-transparent resins include acrylic resin, epoxy resin, polyvinyl alcohol resin, polyimide resin, and vinyl ether resin. In consideration of the refractive index, the adhesion to the reflection electrode layer 34 and the colored layer 36 and the like, these resins may be used either solely or as a mixture of two or more.

Fine particles capable of scattering light include: fine particles of inorganic materials, such as silicon oxide, aluminum oxide, and barium sulfate; fine particles of organic materials, such as acrylic resins, divinylbenzene resins, benzoguanamine resins, styrene resins, melamine resins, acryl-styrene resins, polycarbonate resins, polyethylene resins, and polyvinyl chloride resins; and fine particles of a mixture of two or more types of the above inorganic and organic materials. Among them, melamine resins, benzoguanamine resins, mixtures of two or more of these resins, and copolymers of monomers constituting these resins are preferred from the viewpoints of transparency and durability. These fine particles may have an average particle diameter of 0.1 to 5.0 μm, preferably 0.1 to 4.0 μm, more preferably 0.1 to 2.0 μm. When the average particle diameter is less than 0.1 μm, the scattering effect cannot be substantially attained. The content of the fine particles in the light scattering layer 35 may be 0.5 to 70% by weight, preferably 1.0 to 50% by weight. The thickness of the light scattering layer 35 may be about 0.5 to 20 μm, preferably about 1.0 to 10 μm. The light scattering fine particles are preferably spherical from the viewpoint of enhancing the scattering effect.

Also in the color filter 31, the use of fine particles formed of the above materials in the light scattering layer 35 can realize a haze of 10 to 90, preferably 25 to 80, more preferably 30 to 70, a total light transmission of not less than 30%, and a diffused light transmission of not less than 10%. In the system using a front scattering plate, parallax (unsharpness of image) increases with increasing the haze. By contrast, according to the present invention, by virtue of the inclusion of the light scattering layer in the color filter, the parallax does not occur even in the case of high haze.

The colored layer 36 may be formed by pigment dispersion, dyeing, electrodeposition and other conventional methods. Each of the color patterns (36R, 36G, 36B) may be arranged in a desired form such as stripe, mosaic, triangular, or four-pixel placement without particular limitation.

In the above color filter 31, even though there is coloring of the light scattering layer 35, the deterioration in color properties can be surely compensated for by the color property correction of the colored layer 36. Therefore, in a reflection color liquid crystal display device using the color filter 31 which has been produced by a process which is different from the production process of the liquid crystal display device, a deterioration in color properties does not substantially occur. Further, since the light scattering layer 35 is included within the color filter 31, there is no need to provide a front scattering plate which has been provided on the color filter in its viewer side in the conventional reflection color liquid crystal display device. Thus, a reflection color liquid crystal display device having high luminance can be realized. Moreover, the intervention of the light scattering layer 35 can further enhance the adhesion between the reflection electrode layer 34 and the colored layer 36.

Color Filter According to Fifth Embodiment

Figure 5:
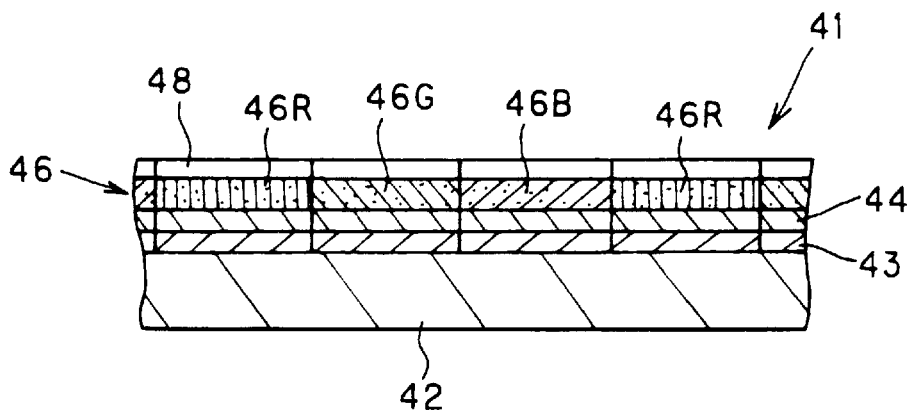
FIG. 5 is a schematic longitudinal sectional view showing one example of the color filter according to the fifth embodiment of the present invention.

FIG. 5 is a schematic longitudinal sectional view of the color filter according to the fifth embodiment of the present invention. A color filter 41 shown in FIG. 5 comprises: a driving element layer 43 provided on a substrate 42; and, stacked on the driving element layer 43 in the following order, a reflective electrode layer 44, a light scattering colored layer 46, and a transparent electrode layer 48. The light scattering colored layer 46 consists of a red color pattern 46R, a green color pattern 46G, and a blue color pattern 46B.

In the color filter 41, the substrate 42, the driving element layer 43, the reflective electrode layer 44, and the transparent electrode layer 48 are respectively the same as the substrate 32, the driving element layer 33, the reflective electrode layer 34, and the transparent electrode layer 38 in the color filter 31, and, hence, the description thereof will be omitted.

In the color filter 41, the light scattering colored layer 46 has the same function as a colored layer in the conventional reflection color liquid crystal display device and, at the same time, functions to properly scatter light incident on a reflection liquid crystal display device, thereby ensuring satisfactory visibility.

The light scattering colored layer 46 is such that fine particles capable of scattering light have been dispersed in a colored layer formed by a conventional pigment dispersion, dyeing, electrodeposition or other method. The fine particles capable of scattering light include those described above in connection with the color filter 31. The content of the fine particles in the light scattering colored layer 46 may be 0.5 to 70% by weight, preferably 1.0 to 50% by weight. The thickness of the light scattering colored layer 46 may be 0.5 to 15 μm, preferably 0.5 to 10 μm.

Also in this color filter 41, the use of fine particles formed of the above materials in the light scattering colored layer 46 can realize a haze of 10 to 90, preferably 25 to 80, more preferably 30 to 70, a total light transmission of not less than 30%, and a diffused light transmission of not less than 10%. In the system using a front scattering plate, parallax (unsharpness of image) increases with increasing the haze.

By contrast, according to the present invention, by virtue of the inclusion of the light scattering layer in the color filter, the parallax does not occur even in the case of high haze.

Each of the color patterns (46R, 46G, 46B) in the light scattering colored layer 46 may be arranged in a desired form such as stripe, mosaic, triangular, or four-pixel placement without particular limitation.

In the above color filter 41, even though color properties of the light scattering colored layer 46 with light scattering fine particles dispersed therein are different from color properties inherent in the colored layer, the change in color properties can be surely compensated for by the correction of color properties in the stage of production of the light scattering colored layer 46. Further, the level of light scattering can be closely regulated as desired for each color by regulating the content of the fine particles. Therefore, in a reflection color liquid crystal display device using the color filter 41 which has been produced by a process which is different from the production process of the liquid crystal display device, a deterioration in color properties attributable to light scattering does not substantially occur. Further, since the light scattering colored layer 46 is included within the color filter 41, there is no need to provide a front scattering plate which has been provided on the color filter in its viewer side in the conventional reflection color liquid crystal display device. Thus, a reflection color liquid crystal display device having high luminance can be realized.

Color Filter According to Sixth Embodiment

Figure 6:
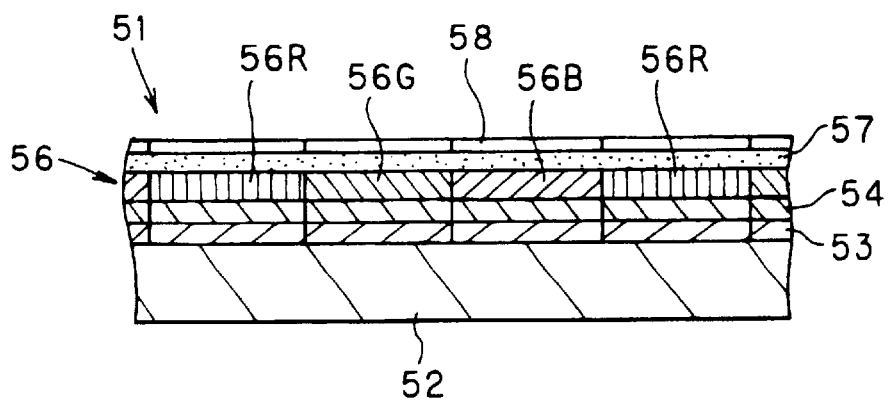
FIG. 6 is a schematic longitudinal sectional view showing one example of the color filter according to the sixth embodiment of the present invention.

FIG. 6 is a schematic longitudinal sectional view of the color filter according to the sixth embodiment of the present invention. A color filter 51 shown in FIG. 6 comprises: a driving element layer 53 provided on a substrate 52; and, stacked on the driving element layer 53 in the following order, a reflective electrode layer 54, a colored layer 56, a light scattering flattening layer 57, and a transparent electrode layer 58. The colored layer 56 consists of a red color pattern 56R, a green color pattern 56G, and a blue color pattern 56B.

In the color filter 51, the substrate 52, the driving element layer 53, the reflective electrode layer 54, the colored layer 56, and the transparent electrode layer 58 are respectively the same as the substrate 32, the driving element layer 33, the reflective electrode layer 34, the colored layer 36, and the transparent electrode layer 38 in the color filter 31, and, hence, the description thereof will be omitted.

In the color filter 51, the light scattering flattening layer 57 functions to eliminate fine irregularities on the surface of the colored layer 56, thereby evening the thickness of the liquid crystal layer and, at the same time, functions to properly scatter light incident on a reflection liquid crystal display device, thereby ensuring satisfactory visibility.

The light scattering flattening layer 57 is formed of, for example, a resin, such as an acrylic resin, an epoxy resin, a vinyl ether resin, a polyimide resin, or a propynyl resin, with fine particles capable of scattering light dispersed therein. In this case, the fine particles capable of scattering light may be those as described above in connection with the color filter 31. The content of the fine particles in the light scattering flattening layer 57 may be 0.5 to 70% by weight, preferably 1.0 to 50% by weight. The thickness of the light scattering flattening layer 57 may be about 0.5 to 20 μm, preferably about 1.0 to 10 μm.

Also in this color filter 51, the use of fine particles formed of the above materials in the light scattering flattening layer 57 can realize a haze of 10 to 90, preferably 25 to 80, more preferably 30 to 70, a total light transmission of not less than 30%, and a diffused light transmission of not less than 10%. In the system using a front scattering plate, parallax (unsharpness of image) increases with increasing the haze. By contrast, according to the present invention, by virtue of the inclusion of the light scattering layer in the color filter, the parallax does not occur even in the case of high haze.

In the above color filter 51, even though there is coloring of the light scattering flattening layer 57, the deterioration in color properties can be surely compensated for by the color property correction of the colored layer 56 in the stage of production of the color filter 51. Therefore, in a reflection color liquid crystal display device using the color filter 51, a deterioration in color properties attributable to light scattering does not occur. Further, since the light scattering flattening layer 57 is included within the color filter 51, there is no need to provide a front scattering plate which has been provided on the color filter in its viewer side in the conventional reflection color liquid crystal display device. Thus, a reflection color liquid crystal display device having high luminance can be realized. Further, by virtue of improved strength attained by the provision of the light scattering flattening layer 57, the gap (thickness of the liquid crystal layer) can be more easily regulated by a spacer.

Color Filters According to Seventh to Twelfth Embodiments

In the color filters according to the seventh to twelfth embodiments of the present invention, light scattering fine particles are contained in two layers in the color filter. The division of the light scattering fine particles into two parts, which are incorporated into two respective layers, can reduce the amount of the light scattering fine particles per layer and, even when the haze of each layer is lowered, enables the haze of the whole color filter to be kept. Therefore, the thickness of each layer can be reduced, and the regulation of the layer thickness is easier than that in the case where the light scattering fine particles are incorporated into only one layer.

Among these embodimetns, the color filters according to the seventh to ninth embodiments are of such a type that is provided on a liquid crystal layer in its viewer side in a reflection color liquid crystal display device. On the other hand, the color filters according to the tenth to twelfth embodiments are of such a type that is provided on a liquid crystal layer in its side remote from the viewer in a reflection color liquid crystal display device.

Color Filter According to Seventh Embodiment

The color filter according to the seventh embodiment is such that, in the color filter according to the first embodiment shown in FIG. 1, the light scattering fine particles are contained in the light scattering layer 3, as well as in the colored layer 4. That is, the color filter according to this embodiment is such that the colored layer 4 in the color filter according to the first embodiment has been replaced with the light scattering colored layer 12 in the color filter according to the second embodiment. Therefore, the light scattering fine particles used in this embodiment are the same as those used in the second embodiment. In the seventh embodiment, for the light scattering fine particles contained in the light scattering layer and the light scattering colored layer, the content of the light scattering fine particles in each layer is not particularly limited so far as the light scattering fine particles are distributed to both the layers so as to finally provide an optimal haze.

In the seventh embodiment, the light scattering fine particles may be contained in at least one color pattern among the color patterns (4R, 4G, 4B), and the content of the light scattering fine particles may be varied for each color. This is advantageous in that, when a uniform haze cannot be provided, the regulation can be finely made so as to provide a uniform haze. It is a matter of course that the light scattering fine particle may be contained in all the color patterns.

Color Filter According to Eighth Embodiment

The color filter according to the eighth embodiment is such that, in the color filter according to the third embodiment shown in FIG. 3, the light scattering fine particles are contained in the light scattering flattening layer 26, as well as in the colored layer 24. That is, the color filter according to this embodiment is such that the colored layer 24 in the color filter according to the third embodiment has been replaced with the light scattering colored layer 14 in the color filter according to the second embodiment. Therefore, the light scattering fine particles used in this embodiment are the same as those used in the second embodiment. In the eighth embodiment, for the light scattering fine particles contained in the light scattering layer and the light scattering colored layer, the content of the light scattering fine particles in each layer is not particularly limited so far as the light scattering fine particles are distributed to both the layers so as to finally provide an optimal haze.

In the eighth embodiment, the light scattering fine particles may be contained in at least one color pattern among the color patterns (24R, 24G, 24B), and the content of the light scattering fine particles may be varied for each color. This is advantageous in that, when a uniform haze cannot be provided, the regulation can be finely made so as to provide a uniform haze. It is a matter of course that the light scattering fine particle may be contained in all the color patterns.

Color Filter According to Ninth Embodiment

The color filter according to the ninth embodiment is such that, in the color filter according to the first embodiment shown in FIG. 1, the light scattering fine particles are contained in the light scattering layer 3 and, in addition, a light scattering flattening layer 26 as used in the third embodiment is provided between the colored layer 4 and the transparent electrode layer 5. This is advantageous in that the adhesion between the transparent substrate 2 and the colored layer 4 can be further enhanced by the light scattering layer 3 and, in addition, the light scattering flattening layer 26 can eliminate the irregularities on the surface of the colored layer 4 to provide a flat surface. In the ninth embodiment, the content of the light scattering fine particles in the light scattering layer and the light scattering flattening layer is not particularly limited so far as the light scattering fine particles are distributed to both the layers so as to finally provide an optimal haze.

Color Filter According to Tenth Embodiment

The color filter according to the tenth embodiment is such that, in the color filter according to the fourth embodiment shown in FIG. 4, the light scattering fine particles are contained in the light scattering layer 35, as well as in the colored layer 36. That is, the color filter according to this embodiment is such that the colored layer 36 in the color filter according to the fourth embodiment has been replaced with the light scattering colored layer 46 in the color filter according to the fifth embodiment. Therefore, the light scattering fine particles used in this embodiment are the same as those used in the fifth embodiment. In the tenth embodiment, for the light scattering fine particles contained in the light scattering layer and the colored layer, the content of the light scattering fine particles in each layer is not particularly limited so far as the light scattering fine particles are distributed to both the layers so as to finally provide an optimal haze.

In the tenth embodiment, the light scattering fine particles may be contained in at least one color pattern among the color patterns (36R, 36G, 36B), and the content of the light scattering fine particles may be varied for each color. This is advantageous in that, when a uniform haze cannot be provided, the regulation can be finely made so as to provide a uniform haze. It is a matter of course that the light scattering fine particle may be contained in all the color patterns.

Color Filter According to Eleventh Embodiment

The color filter according to the eleventh embodiment is such that in the color filter according to the sixth embodiment shown in FIG. 6, the light scattering fine particles are contained in the light scattering flattening layer 57, as well as in the colored layer 56. That is, the color filter according to this embodiment is such that the colored layer 56 in the color filter according to the sixth embodiment has been replaced with the light scattering colored layer 46 in the color filter according to the fifth embodiment. Therefore, the light scattering fine particles used in this embodiment are the same as those used in the fifth embodiment. In the eleventh embodiment, for the light scattering fine particles contained in the light scattering layer and the colored layer, the content of the light scattering fine particles in each layer is not particularly limited so far as the light scattering fine particles are distributed to both the layers so as to finally provide an optimal haze.

In the eleventh embodiment, the light scattering fine particles may be contained in at least one color pattern among the color patterns (56R, 56G, 56B), and the content of the light scattering fine particles may be varied for each color. This is advantageous in that, when a uniform haze cannot be provided, the regulation can be finely made so as to provide a uniform haze. It is a matter of course that the light scattering fine particle may be contained in all the color patterns.

Color Filter According to Twelfth Embodiment

The color filter according to the twelfth embodiment is such that, in the color filter according to the fourth embodiment shown in FIG. 4, the light scattering fine particles are contained in the light scattering layer 35 and, in addition, a light scattering flattening layer 57 as used in the sixth embodiment is provided between the colored layer 36 and the transparent electrode layer 38. This is advantageous in that the adhesion between the transparent substrate 32 and the colored layer 36 can be further enhanced by the light scattering layer 35 and, in addition, the light scattering flattening layer 26 can eliminate the irregularities on the surface of the colored layer 36 to provide a flat surface. In the twelfth embodiment, the content of the light scattering fine particles in the light scattering layer and the light scattering flattening layer is not particularly limited so far as the light scattering fine particles are distributed to both the layers so as to finally provide an optimal haze.

Color Filter According to Embodiment Wherein Colorant is Contained

According to a preferred embodiment of the present invention, a colorant for the correction of color properties may be contained in at least one of the layers constituting the color filters according to first to twelfth embodiments to impart desired color properties. As described above, light scattering fine particles are contained in the color filters according to the present invention so as to provide a desired haze. Therefore, an attempt to impart a satisfactory light scattering function often results in increased thickness of the light scattering layer. For example, the thickness of a conventional protective layer or the like is not more than 2 μm, while, in the case of a light scattering layer, the thickness is sometimes about 0.5 to 20 μm. In this case, when a coloring component having an adverse effect on color properties of a color filter is present even in a small amount in a composition for a light scattering layer, the level of coloring of the light scattering layer increases with increasing the thickness of the layer. Materials, which are considered to function as coloring components, include resin components and polymerization initiators. These materials are known to have colors ranging from pale yellow to red, independently of whether or not the material is of thermosetting type or photocurable type.

According to the present embodiment, the incorporation of a colorant in at least one layer within the color filter can reduce a change in color properties attributable to the coloring and can realize high luminance and excellent color properties. This embodiment can impart desired color properties and can easily cope with various spectral specifications. Further, a material suitable for the production can be selected from a wide variety of materials without being restricted by the level of coloring attributable to increased layer thickness. This can advantageously improve the productivity.

Any colorant may be used in the present invention without particular limitation. For example, conventional colorants, such as organic pigments, inorganic pigments, and dyes, may be used. Further, organic or inorganic pigments and dyes may be used in combination.

Examples of preferred organic pigments include: i) blue pigments, such as C.I. Pigment Blue 15, C.I. Pigment Blue 15:3, C.I. Pigment Blue 15:4, C.I. Pigment Blue 15:6, C.I. Pigment Blue 22, C.I. Pigment Blue 60, and C.I. Pigment Blue 64; ii) violet pigments, such as C.I. Pigment Violet 19, C.I. Pigment Violet 23, C.I. Pigment Violet 29, C.I. Pigment Violet 30, C.I. Pigment Violet 31, C.I. Pigment Violet 36, C.I. Pigment Violet 37, C.I. Pigment Violet 38, C.I. Pigment Violet 40, C.I. Pigment Violet 42, C.I. Pigment Violet 47, C.I. Pigment Violet 48, C.I. Pigment Violet 49, C.I. Pigment Violet 50; iii) green pigments, such as C.I. Pigment Green 7, C.I. Pigment Green 10, C.I. Pigment Green 36; iv) red pigments, such as C.I. Pigment Red 5, C.I. Pigment Red 9, C.I. Pigment Red 10, C.I. Pigment Red 17, C.I. Pigment Red 23, C.I. Pigment Red 88, C.I. Pigment Red 97, C.I. Pigment Red 119, C.I. Pigment Red 122, C.I. Pigment Red 123, C.I. Pigment Red 144, C.I. Pigment Red 149, C.I. Pigment Red 155, C.I. Pigment Red 166, C.I. Pigment Red 168, C.I. Pigment Red 177, C.I. Pigment Red 179, C.I. Pigment Red 180, C.I. Pigment Red 190, C.I. Pigment Red 192, C.I. Pigment Red 198, C.I. Pigment Red 207, C.I. Pigment Red 209, C.I. Pigment Red 215, C.I. Pigment Red 216, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 240, C.I. Pigment Red 250, C.I. Pigment Red 254, C.I. Pigment Red 48:1, C.I. Pigment Red 48:2, C.I. Pigment Red 48:3, C.I. Pigment Red 48:4, C.I. Pigment Red 52:2; v) orange pigments, such as C.I. Pigment Orange 31, C.I. Pigment Orange 36, C.I. Pigment Orange 43, C.I. Pigment Orange 51, C.I. Pigment Orange 55, C.I. Pigment Orange 59, C.I. Pigment Orange 61, C.I. Pigment Orange 71; vi) yellow pigments, such as C.I. Pigment Yellow 1, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 20, C.I. Pigment Yellow 24, C.I. Pigment Yellow 55, C.I. Pigment Yellow 60, C.I. Pigment Yellow 65, C.I. Pigment Yellow 73, C.I. Pigment Yellow 74, C.I. Pigment Yellow 81, C.I. Pigment Yellow 83, C.I. Pigment Yellow 86, C.I. Pigment Yellow 93, C.I. Pigment Yellow 95, C.I. Pigment Yellow 97, C.I. Pigment Yellow 98, C.I. Pigment Yellow 99, C.I. Pigment Yellow 100, C.I. Pigment Yellow 101, C.I. Pigment Yellow 104, C.I. Pigment Yellow 106, C.I. Pigment Yellow 108, C.I. Pigment Yellow 109, C.I. Pigment Yellow 110, C.I. Pigment Yellow 113, C.I. Pigment Yellow 114, C.I. Pigment Yellow 116, C.I. Pigment Yellow 117, C.I. Pigment Yellow 119, C.I. Pigment Yellow 120, C.I. Pigment Yellow 125, C.I. Pigment Yellow 126, C.I. Pigment Yellow 127, C.I. Pigment Yellow 128, C.I. Pigment Yellow 129, C.I. Pigment Yellow 137, C.I. Pigment Yellow 138, C.I. Pigment Yellow 139, C.I. Pigment Yellow 147, C.I. Pigment Yellow 148, C.I. Pigment Yellow 150, C.I. Pigment Yellow 151, C.I. Pigment Yellow 152, C.I. Pigment Yellow 153, C.I. Pigment Yellow 154, C.I. Pigment Yellow 156, C.I. Pigment Yellow 166, C.I. Pigment Yellow 168, C.I. Pigment Yellow 175; vii) brown pigments, such as C.I. Pigment Brown 23, C.I. Pigment Brown 25, C.I. Pigment Brown 26; and viii) black pigments, such as C.I. Pigment Black 7.

Examples of preferred inorganic pigments usable in the present invention include: i) white pigments, such as zinc sulfate, zinc white, barium sulfate, barium carbonate, calcium carbonate, white lead, clay, talc, silicon oxide, zinc sulfide, titanium oxide, and lead titanate; ii) black pigments, such as carbon black; iii) yellow pigments, such as yellow lead, yellow zinc, and barium chromate; iv) orange pigments, such as chrome orange and chrome vermilion; v) red pigments, such as iron oxide red and minium; vi) purple pigments, such as cobalt purple and manganese purple; vii) blue pigments, such as iron blue and ultramarine blue; viii) green pigments, such as chrome green, chromium oxide, and cobalt green. Fluorescent pigments, luminous pigments and the like may also be used.

The colorant may be a dye. Examples of preferred dyes usable herein include azo dyes, phthalocyanine dyes, anthraquinone dyes, methine dyes, oxazine dyes, carbonium dyes, quinoneimine dyes, benzoquinone dyes, naphthoquinone dyes, triphenylmethane dyes, indigoid dyes, perinone dyes, naphthalimide dyes, quinoline dyes, and dyes based on metal-containing complex salts of the above dyes.

According to the present embodiment, the layer, in which the colorant is to be contained, is not particularly limited, and the colorant may be contained in any of the layers described above in connection with the first to twelfth embodiments. In particular, when the light scattering fine particles are contained in the colored layer, the colorant is preferably contained in the colored layer. When the light scattering layer or the light scattering flattening layer is used, the colorant is preferably contained in the light scattering layer or the light scattering flattening layer.

The color filter according to the present invention may be such that a black matrix may be provided between adjacent color patterns constituting the colored layers 4, 24, 36, 56 and the light scattering colored layers 14, 46. In this case, the black matrix may be formed of a light-shielding resin or a metal, such as chromium.

Reflection Color Liquid Crystal Display Device

Embodiments of a reflection color liquid crystal display device using the color filter according to the present invention will be described.

FIG. 7 is a schematic longitudinal sectional view of a reflection color liquid crystal display device using the color filter 1 according to the present invention shown in FIG. 1. In the reflection color liquid crystal display device 61 shown in FIG. 7, the color filter 1 according to the present invention is provided on the viewer side. A phase difference plate 62 and a polarizing plate 63 are provided on the transparent substrate 2 in the color filter 1. A liquid crystal layer 68 is provided between the color filter 1 and a counter electrode substrate, the counter electrode substrate comprising a substrate 65 and, provided on the substrate 65, a driving element layer 66 and a reflective electrode layer 67.

FIG. 8 is a schematic longitudinal sectional view of a reflection color liquid crystal display device using the color filter 41 according to the present invention shown in FIG. 5. In the reflection color liquid crystal display device 71 shown in FIG. 8, a counter substrate comprising a transparent substrate 72 having, on one side, a transparent electrode layer 73 and, on the other side, a phase difference plate 74 and a polarizing plate 75 is disposed so as to face the color filter 41 according to the present invention while leaving a predetermined gap between the counter substrate and the color filter 41, and a liquid crystal layer 78 is provided in the gap portion. In this reflection color liquid crystal display device 71, the color filter 41 according to the present invention is located on the liquid crystal layer 78 in its side remote from a viewer.

The color filter according to the present invention may be used in semi-transmission color liquid crystal display devices beside the reflection color liquid crystal display devices.

The semi-transmission color liquid crystal display device has been developed as having both advantages of the transmission color liquid crystal display device and advantages of the reflection color liquid crystal display device. In the semi-transmission color liquid crystal device, a transmission display portion and a reflection display portion are provided in one pixel to provide a display mode which has rendered the transmission liquid crystal display mode and the reflection liquid crystal display mode, which have been different from each other in display principle, compatible with each other.

When a semi-transmission color liquid crystal display device having a structure as shown in FIG. 7 is prepared, a half mirror type electrode layer or a perforated electrode layer is used as the reflective electrode layer 67, and the color filter 1, 11, 21 according to the present invention as such may be used.

When a semi-transmission color liquid crystal display device having a structure as shown in FIG. 8 is prepared, a half mirror electrode layer or a perforated electrode layer is used as the reflective electrode layer 34, 44, 54 in the color filter 31, 41, 51 according to the present invention. The half mirror electrode layer is such that a semi-transmission property, which may be defined as a property such that a part of incident light is transmitted while reflecting the other part of the light, has been imparted to the conductive thin layer per se. The half mirror electrode layer may be formed by controlling a conventional film formation process, such as vapor deposition, sputtering, CVD, or ion plating. The perforated electrode layer is such that one pixel has been allocated in terms of area to a transmissive portion (a perforated portion) and a reflective portion. A metallic thin layer may be formed by the above film formation process, followed by patterning to provide predetermined fine openings.

As is apparent from the foregoing detailed description, according to the present invention, the provision of a light scattering layer, a light scattering colored layer, or a light scattering flattening layer, which has the function of scattering light, in a color filter can eliminate the need to provide a conventional front scattering plate on a color filter in its viewer side in a reflection color liquid crystal display device, and a deterioration in luminance and color properties caused by the provision of the front scattering plate can be surely compensated for by color property correction of the color filter per se (for example, the colored layer). Therefore, also in a reflection color liquid crystal display device which has been produced by a process different from the production process of the color filter, displayed images have high luminance and excellent color properties. Further, parallax (unsharpness of image) caused by the provision of the conventional front scattering plate can be eliminated. This can realize liquid crystal display devices having high image quality. In particular, the provision of the colored layer on the light scattering layer facilitates color correction. Further, when the light scattering colored layer is provided, the light scattering layer and the colored layer may be formed at a time. This can simplify the production process. Furthermore, the provision of the light scattering flattening layer can additionally offer functions as a protective layer and a flattening layer. The color filter provided with a reflective electrode layer according to the present invention may also be applied to semi-transmission color liquid crystal display devices by using a half mirror electrode layer or a perforated electrode layer as the reflective electrode layer.

EXAMPLES

The following examples further illustrate the present invention.

Example A1

A 0.7 mm-thick glass substrate (an alkali-free glass) was provided as a substrate. A coating liquid having the following composition for a light scattering layer was spin coated on this glass substrate. The coating was dried, followed by exposure, development, and post-baking (200° C., 30 min) to form a light scattering layer (thickness 10 $\mu$m).

Coating Liquid for Light Scattering Layer

Epoxy acrylate (EA 450, manufactured by Toa Gosei Chemical Industry Co., Ltd.) . . . 35 pts.wt.
Polyfunctional acrylate monomer (DPHA, manufactured by Nippon Kayaku Co., Ltd.) . . . 15 pts.wt.
Melamine beads (average particle diameter 0.7 $\mu$m) . . . 10 pts.wt.
Polymerization initiator (Irgacure 184, manufactured by Ciba-Geigy) . . . 4 pts.wt.
Diluting solvent (polyethylene glycol monoethyl acetate) . . . 36 pts.wt.

A photosensitive color material for a red color pattern (Color Mosaic CR-7000, manufactured by Fuji Film Olin Co., Ltd.) was then spin coated on the light scattering layer. The coating was exposed through a predetermined photomask, and then developed with a developing solution (CD, manufactured by Fuji Film Olin Co., Ltd.), followed by holding of the glass substrate at 200° C. for 30 min to cure the developed coating, thereby forming a red color pattern.

A green color pattern and a blue color pattern were formed in the same manner as described just above, except that a photosensitive color material for a green color pattern (Color Mosaic CG-7000, manufactured by Fuji Film Olin Co., Ltd.)

was used for the green color pattern and a photosensitive color material for a blue color pattern (Color Mosaic CG-7000, manufactured by Fuji Film Olin Co., Ltd.) was used for the blue color pattern. Thus, a colored layer was formed. In the formation of the colored layer, in order to perform the correction of color properties with respect to the coloring of the light scattering layer, the coating thickness of each of the photosensitive color materials was brought to 50 to 80% of the coating thickness adopted in the prior art.

Next, a transparent electrode (ITO) layer was formed on the colored layer by a conventional method, and an aligning layer (thickness 0.05 µm) of a polyimide resin was formed on the transparent electrode layer. Thus, a color filter having a structure as shown in FIG. 1 (Example A1) was prepared.

Example A2

A 0.7 mm-thick glass substrate (an alkali-free glass) was provided as a substrate. A coating liquid composed of 27% by weight of melamine beads (fine particles capable of scattering light; average particle diameter 0.7 µm) contained in a photosensitive color material for a red color pattern (Color Mosaic CR-7000, manufactured by Fuji Film Olin Co., Ltd.) was spin coated on this glass substrate. The coating was exposed through a predetermined photomask, and the exposed coating was developed with a developing solution (CD, manufactured by Fuji Film Olin Co., Ltd.), followed by holding of the glass substrate at 200° C. for 30 min to cure the developed coating, thereby forming a red color pattern.

A green color pattern and a blue color pattern were formed in the same manner as described just above, except that a coating liquid composed of 27% by weight of melamine beads (average particle diameter 0.7 µm) contained in a photosensitive color material for a green color pattern (Color Mosaic CG-7000, manufactured by Fuji Film Olin Co., Ltd.) was used for the green color pattern and a coating liquid composed of 27% by weight of melamine beads (average particle diameter 0.7 µm) contained in a photosensitive color material for a blue color pattern (Color Mosaic CB-7000, manufactured by Fuji Film Olin Co., Ltd.) was used for the blue color pattern. Thus, a light scattering colored layer was formed.

Next, a transparent electrode (ITO) layer and an aligning layer were formed in the same manner as in Example A1. Thus, a color filter having a structure as shown in FIG. 2 (Example A2) was prepared.

Example A3

A 0.7 mm-thick glass substrate (an alkali-free glass) was provided as a substrate. A colored layer was formed on this glass substrate in the same manner as in Example A1. In the formation of the colored layer, in order to perform the correction of color properties with respect to the coloring of the light scattering flattening layer described below, the coating thickness of each of the photosensitive color materials was brought to 50 to 80% of the coating thickness adopted in the prior art.

Next, a coating liquid having the following composition for a light scattering flattening layer was spin coated on the colored layer. The coating was dried, followed by exposure, development, and post-baking (200° C., 30 min) to form a light scattering flattening layer (thickness 10 µm).

Coating Liquid for Light Scattering Flattening Layer

Epoxy acrylate (EA 450, manufactured by Toa Gosei Chemical Industry Co., Ltd.) . . . 35 pts.wt.

Polyfunctional acrylate monomer (DPHA, manufactured by Nippon Kayaku Co., Ltd.) . . . 15 pts.wt.

Melamine beads (average particle diameter 0.7 µm) . . . 10 pts.wt.

Polymerization initiator (Irgacure 184, manufactured by Ciba-Geigy) . . . 4 pts.wt.

Diluting solvent (polyethylene glycol monoethyl acetate) . . . 36 pts.wt.

A transparent electrode (ITO) layer and an aligning layer were then formed on the light scattering flattening layer in the same manner as in Example A1. Thus, a color filter having a structure as shown in FIG. 3 (Example A3) was prepared.

A phase difference plate and a polarizing plate were stacked on the glass plate in each of the color filters (Examples A1 to A3) prepared above. Separately, a TFT driving element layer and a reflective electrode layer of aluminum were formed on a 0.7 mm-thick glass substrate, and an aligning layer (thickness 0.05 µm) of a polyimide resin was further formed thereon to prepare a counter electrode substrate. This counter electrode substrate was disposed so as to face the aligning layer in the color filter, followed by the provision of a nematic liquid crystal layer (thickness 5.0 µm) to prepare a reflection color liquid crystal display device.

Example A4

A 0.7 mm-thick glass substrate (an alkali-free glass) was provided as a substrate. A TFT driving element layer and a reflective electrode layer of aluminum were formed on this glass substrate. Next, a coating liquid, for a light scattering layer, having the same composition as used in the coating liquid for a light scattering layer in Example A1 was spin coated on the reflective electrode layer. The coating was dried, followed by exposure, development, and post-baking (200° C., 30 min) to form a light scattering layer (thickness 8.0 µm).

A colored layer was then formed on the light scattering layer in the same manner as in Example A1. In the formation of the colored layer, in order to perform the correction of color properties with respect to the coloring of the light scattering layer, the coating thickness of each of the photosensitive color materials was brought to 50 to 80% of the coating thickness adopted in the prior art.

Next, a transparent electrode (ITO) layer was formed on the colored layer, and an aligning layer (thickness 0.05 µm) of a polyimide resin was formed on the transparent electrode layer. Thus, a color filter having a structure as shown in FIG. 4 (Example A4) was prepared.

Example A5

A 0.7 mm-thick glass substrate (an alkali-free glass) was provided as a substrate. A TFT driving element layer and a reflective electrode layer of aluminum were formed on this glass substrate.

Next, a coating liquid composed of 27% by weight of melamine beads (fine particles capable of scattering light; average particle diameter 0.7 µm) contained in a photosensitive color material for a red color pattern (Color Mosaic CR-7000, manufactured by Fuji Film Olin Co., Ltd.) was spin coated on the reflective electrode layer. The coating was exposed through a predetermined photomask, and the exposed coating was developed with a developing solution (CD, manufactured by Fuji Film Olin Co., Ltd.), followed by holding of the glass substrate at 200° C. for 30 min to cure the developed coating, thereby forming a red color pattern.

A green color pattern and a blue color pattern were formed in the same manner as described just above, except that a coating liquid composed of 27% by weight of melamine beads (average particle diameter 0.7 μm) contained in a photosensitive color material for a green color pattern (Color Mosaic CG-7000, manufactured by Fuji Film Olin Co., Ltd.) was used for the green color pattern and a coating liquid composed of 27% by weight of melamine beads (average particle diameter 0.7 μm) contained in a photosensitive color material for a blue color pattern (Color Mosaic CB-7000, manufactured by Fuji Film Olin Co., Ltd.) was used for the blue color pattern. Thus, a light scattering colored layer was formed.

A transparent electrode layer was then formed on the light scattering colored layer in the same manner as in Example A4, and an aligning layer was further formed thereon to form a color filter having a structure as shown in FIG. 5 (Example A5).

Example A6

A 0.7 mm-thick glass substrate (an alkali-free glass) was provided as a substrate. A TFT driving element layer and a reflective electrode layer of aluminum were formed on this glass substrate.

Next, a colored layer was formed on the reflective electrode layer in the same manner as in Example A1. In the formation of the colored layer, in order to perform the correction of color properties with respect to the coloring of the light scattering flattening layer described below, the coating thickness of each of the photosensitive color materials was brought to 50 to 80% of the coating thickness adopted in the prior art.

Next, a coating liquid, for a light scattering flattening layer, having the same composition as the coating liquid for a light scattering flattening layer in Example A3 was spin coated on the colored layer. The coating was dried, followed by exposure, development, and post-baking (200° C., 30 min) to form a light scattering flattening layer (thickness 8.0 μm).

A transparent electrode layer was then formed on the light scattering colored layer in the same manner as in Example A4, and an aligning layer was further formed thereon to form a color filter having a structure as shown in FIG. 6 (Example A6).

Separately, a transparent electrode (ITO) layer was formed on one side of a 0.7 mm-thick glass substrate, and an aligning layer (thickness 0.05 μm) of a polyimide resin was formed thereon. A phase difference plate and a polarizing plate were stacked on the other side of the glass substrate to form a counter substrate. The counter substrate was disposed so as to face the aligning layer in the color filters (Examples A4 to A6) prepared above, and a nematic liquid crystal layer (thickness 5.0 μm) was provided to prepare a reflection color liquid crystal display device.

Comparative Example A1

A color filter was prepared in the same manner as in Example A1, except that the light scattering layer was not provided. A polarizing plate (AGS 1, manufactured by Nitto Denko Corp.) incorporating a phase difference plate and a forward scattering layer was stacked on the glass substrate of this color filter (comparative example). Separately, a TFT driving element layer and a reflective electrode layer of aluminum were formed on a 0.7 mm-thick glass substrate, and an aligning layer (thickness 0.05 μm) of a polyimide resin was further formed thereon to prepare a counter electrode substrate. This counter electrode substrate was disposed on the color filter in such a manner that the aligning layer in the counter electrode substrate faced the aligning layer in the color filter, followed by the provision of a nematic liquid crystal layer (thickness 5.0 μm) to prepare a reflection color liquid crystal display device.

For the reflection color liquid crystal display devices using the color filters of the present invention (Examples A1 to A6) and the reflection color liquid crystal display device using the comparative color filter (Comparative Example A1), the luminance of displayed images was measured by the following method. The results were as summarized in Table 1 below.

Method for Measuring Luminance

A luminance meter (BM 7, manufactured by Topcon Corp.) was installed on the front of the reflection color liquid crystal display devices, and the reflectance (front luminance) was measured with the angle of incidence of light from a light source being varied at 15 degrees, 20 degrees, 30 degrees, and 45 degrees.

Further, for the color filters of the present invention (Examples A1 to A3) and the comparative color filter (comparative Example A1), the haze, total light transmission, and diffused light transmission were measured with a direct reading haze meter manufactured by Toyo Seiki Seisaku Sho, Ltd. The results were as summarized in Table 1 below.

TABLE 1

| Color filter | Reflectance, % | | | | Results of measurement on color filter per se | | |
|---|---|---|---|---|---|---|---|
| | 15° | 20° | 30° | 45° | Haze | Total light transmission | Diffused light transmission |
| Ex. A1 | 34 | 21 | 16 | 4 | 58 | 50 | 29 |
| Ex. A2 | 34 | 21 | 16 | 4 | 57 | 51 | 29 |
| Ex. A3 | 33 | 21 | 15 | 4 | 57 | 50 | 28 |
| Ex. A4 | 33 | 20 | 15 | 3 | — | — | — |
| Ex. A5 | 32 | 20 | 15 | 3 | — | — | — |
| Ex. A6 | 32 | 20 | 15 | 3 | — | — | — |
| Comp. Ex. A1 | 28 | 15 | 6 | <1 | 26 | 46 | 12 |

Example B1

A change in spectral characteristics upon the addition of a colorant to the color filter of the present invention was examined. Since the measurement can be facilitated by eliminating scattered light and, in addition, the spectral characteristics in the case of the addition of the light scattering fine particles and the colorant can be derived from the results of a calculation of a change in spectral characteristics upon the addition of light scattering fine particles, in this example, a coating liquid for a light scattering layer, wherein light scattering fine particles have been removed from a material for a light scattering layer, was prepared, followed by the measurement of spectral characteristics thereof.

At the outset, liquids were prepared on the assumption that various pigments had been dispersed in the light scattering layer and the light scattering flattening layer. In dispersing the pigment, a paint shaker was used. However, various dispergators, such as roller dispergators, may be used for the dispersion of pigments.

Formulation Example 1

Epoxy acrylate (EA 450, manufactured by Toa Gosei Chemical Industry Co., Ltd.) . . . 50 pts.wt.
Polyfunctional acrylate monomer (DPHA, manufactured by Nippon Kayaku Co., Ltd.) . . . 20 pts.wt.
Polymerization initiator (Irgacure 907, manufactured by Nippon Kayaku Co., Ltd.) . . . 5 pts.wt.
P.R 209 red pigment . . . 1 pt.wt.
Dispersant (Disperbyk 161, manufactured by Bik-Chemie Japan K.K.) . . . 5 pts.wt.

Formulation Example 2

Epoxy acrylate (EA 450, manufactured by Toa Gosei Chemical Industry Co., Ltd.) . . . 50 pts.wt.
Polyfunctional acrylate monomer (DPHA, manufactured by Nippon Kayaku Co., Ltd.) . . . 20 pts.wt.
Polymerization initiator (Irgacure 907, manufactured by Nippon Kayaku Co., Ltd.) . . . 5 pts.wt.
P.B 15:3 blue pigment . . . 1 pt.wt.
Dispersant (Disperbyk 161, manufactured by Bik-Chemie Japan K.K.) . . . 5 pts.wt.

Formulation Example 3

Epoxy acrylate (EA 450, manufactured by Toa Gosei Chemical Industry Co., Ltd.) . . . 50 pts.wt.
Polyfunctional acrylate monomer (DPHA, manufactured by Nippon Kayaku Co., Ltd.) . . . 20 pts.wt.
Polymerization initiator (Irgacure 907, manufactured by Nippon Kayaku Co., Ltd.) . . . 5 pts.wt.
P.V 23. violet pigment . . . 1 pt.wt.
Dispersant (Disperbyk 161, manufactured by Bik-Chemie Japan K.K.) . . . 5 pts.wt.

Next, the procedure of Example A3 was repeated up to the step at which the colored layer was formed. The coating liquid not containing light scattering fine particles for a light scattering layer prepared according to Formulation Example 1 was coated to a thickness of 10 μm onto the colored layer. The coating was dried, followed by exposure, development, and post-baking (200° C., 30 min). Thus, a color filter was prepared. Another color filter was prepared in the same manner as described just above, except that the coating liquid prepared according to Formulation Example 2 was used. Still another color filter was prepared in the same manner as described just above, except that the coating liquid prepared according to Formulation Example 3 was used. A further color filter was prepared in the same manner as described just above, except that a coating liquid having the same composition as that according to Formulation Example 1 except for the absence of the colorant was used.

For the color filters thus obtained, the reflection spectral chromaticity coordinate (D65 light source) was measured with a microspectrophotometric apparatus (model: OSP-SP 200, manufactured by Olympus Optical Co., LTD.).

Figure 9:
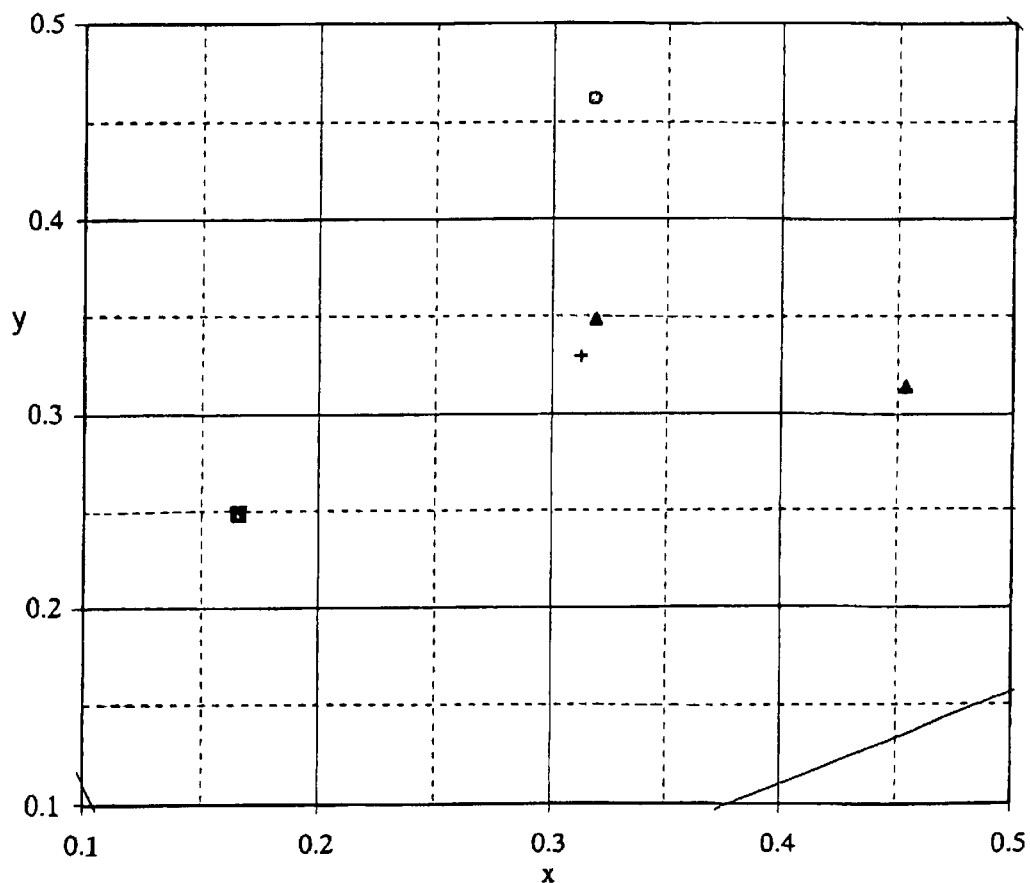
FIG. 9 is a diagram showing an example of a reflection spectral chromaticity coordinate in the case where a red pigment has been added to the color filter according to the present invention.
Figure 10:
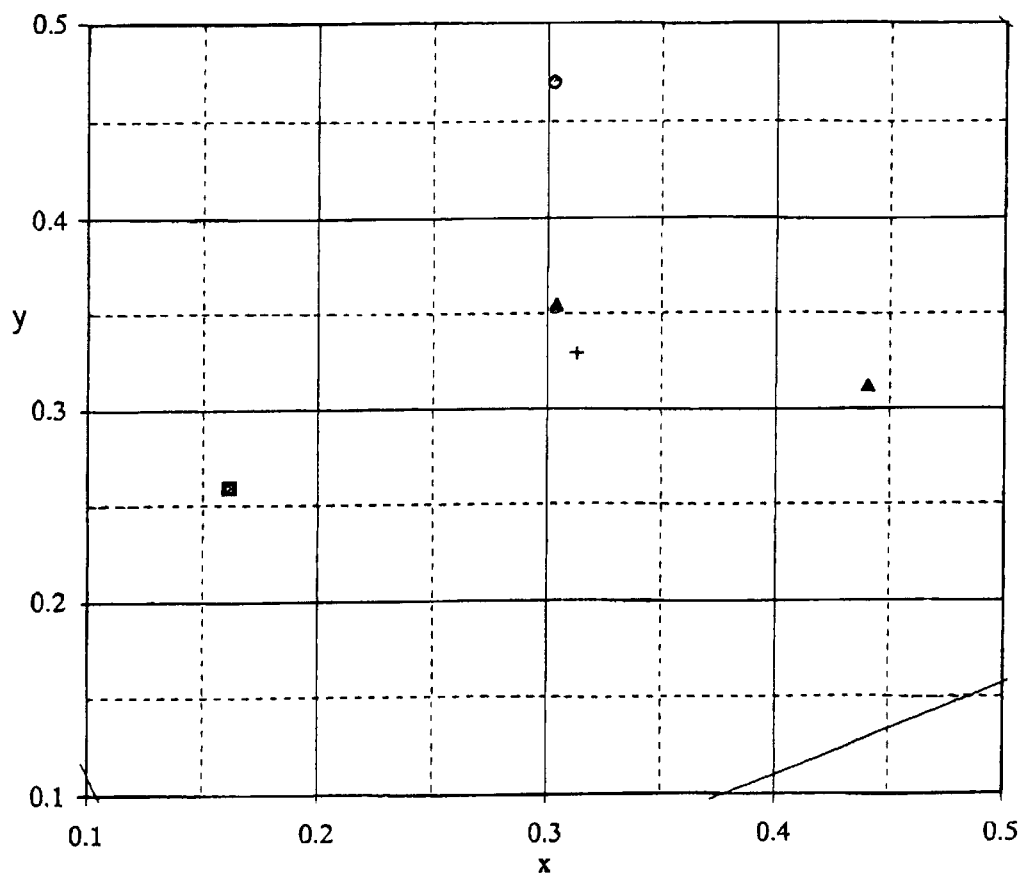
FIG. 10 is a diagram showing an example of a reflection spectral chromaticity coordinate in the case where a blue pigment has been added to the color filter according to the present invention.
Figure 11:
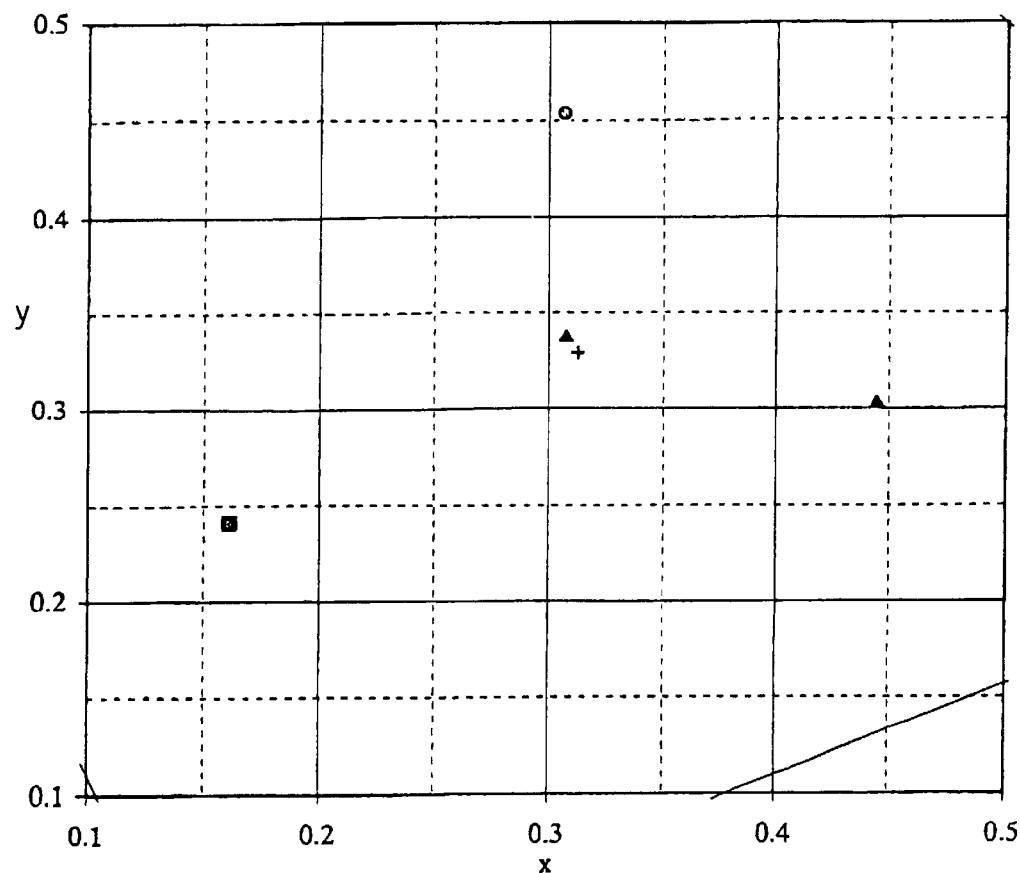
FIG. 11 is a diagram showing an example of a reflection spectral chromaticity coordinate in the case where a purple pigment has been added to the color filter according to the present invention.
Figure 12:
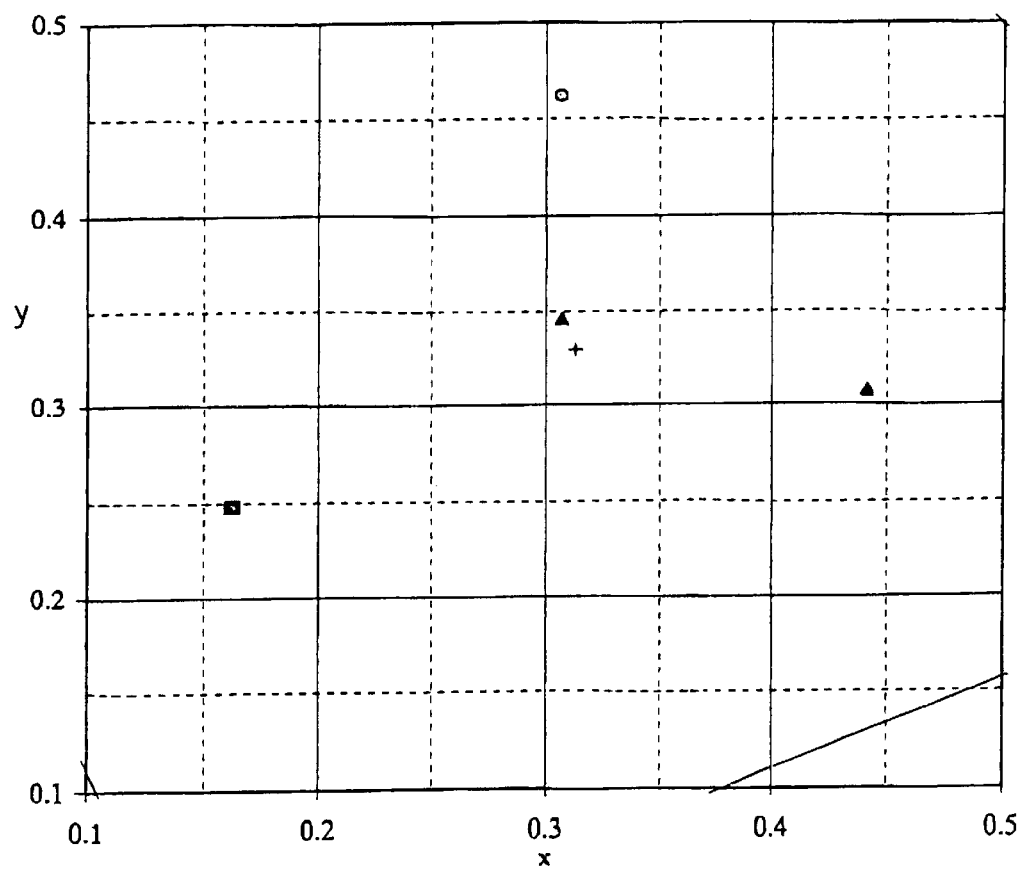
FIG. 12 is a diagram showing an example of a reflection spectral chromaticity coordinate in the case where no colorant has been added to the color filter according to the present invention.

FIG. 9 shows the results of measurement on the color filter using the coating liquid prepared according to Formulation Example 1, FIG. 10 the results of measurement on the color filter using the coating liquid prepared according to Formulation Example 2, FIG. 11 the results of measurement on the color filter using the coating liquid prepared according to Formulation Example 3, and FIG. 12 the results of measurement on the colorant-free color filter. More specifically, in FIG. 9, the results of measurement on the color filter with a red pigment added thereto are plotted on a chromaticity coordinate; in FIG. 10, the results of measurement on the color filter with a blue pigment added thereto are plotted on a chromaticity coordinate; in FIG. 11, the results of measurement on the color filter with a purple pigment added thereto are plotted on a chromaticity coordinate; and in FIG. 12, the results of measurement on the color filter with no colorant added thereto are plotted on a chromaticity coordinate.

In the drawings, ○ corresponds to the chromaticity coordinate of green, □ corresponds to the chromaticity coordinate of blue, ▲ corresponds to the chromaticity coordinate of red, Δ located in the center of the coordinate corresponds to the chromaticity coordinate of white, and + corresponds to the chromaticity coordinate of the standard light D65.

As is apparent from FIGS. 9 to 12, embodiments using the colorants according to the present invention, as compared with the color filter (FIG. 12) wherein the colored layer has been formed under the same conditions, desired spectral characteristics of red (FIG. 9), blue (FIG. 10), and purple (FIG. 11) can be imparted. That is, the color filter according to the present invention can cope with various spectral characteristics specifications.

Example B2

A colorant was added to the color filter of the present invention to perform the color correction of a light scattering layer, thereby reducing a problem of yellowing of the color filter per se. As described above, in some cases, the light scattering layer should have a large thickness of not less than 5 μm from the viewpoint of exhibiting the function of the light scattering layer. When a coloring component having an adverse effect on the color properties of the color filter is present in a material for the light scattering layer poses a problem that the color filter per se is yellowed. The present example solves this problem.

Also in this example, since the measurement can be facilitated by eliminating scattered light and, in addition, the spectral characteristics in the case of the addition of the light scattering fine particles and the colorant can be derived from the results of a calculation of a change in spectral characteristics upon the addition of light scattering fine particles, a coating liquid for a light scattering layer, wherein light scattering fine particles had been removed from a material for a light scattering layer, was prepared, followed by the measurement of spectral characteristics thereof.

At the outset, on the assumption that various pigments had been dispersed in the light scattering layer and the light scattering flattening layer, coating liquids for a light scattering layer were prepared according to Formulation Examples 4 to 6. In dispersing the pigment, a paint shaker was used. However, various dispergators, such as roller dispergators, may be used for the dispersion of pigments.

Formulation Example 4

Epoxy acrylate (EA 450, manufactured by Toa Gosei Chemical Industry Co., Ltd.) . . . 50 pts.wt.
Polyfunctional acrylate monomer (DPHA, manufactured by Nippon Kayaku Co., Ltd.) . . . 20 pts.wt.
Polymerization initiator (Irgacure 907, manufactured by Nippon Kayaku Co., Ltd.) . . . 5 pts.wt.

Formulation Example 5

Epoxy acrylate (EA 450, manufactured by Toa Gosei Chemical Industry Co., Ltd.) . . . 50 pts.wt.
Polyfunctional acrylate monomer (DPHA, manufactured by Nippon Kayaku Co., Ltd.) . . . 20 pts.wt.
Polymerization initiator (Irgacure 369, manufactured by Nippon Kayaku Co., Ltd.) . . . 5 pts.wt.

Formulation Example 6

Epoxy acrylate (EA 450, manufactured by Toa Gosei Chemical Industry Co., Ltd.) . . . 50 pts.wt.

Polyfunctional acrylate monomer (DPHA, manufactured by
  Nippon Kayaku Co., Ltd.) . . . 20 pts.wt.
Polymerization initiator (Irgacure 369, manufactured by
  Nippon Kayaku Co., Ltd.) . . . 5 pts.wt.
P.V 23. violet pigment . . . 0.5 pt.wt.
Dispersant (Disperbyk 161, manufactured by Bik-Chemie
  Japan K.K.) . . . 5 pts.wt.

The photopolymerization initiator (Irgacure 369) used in Formulation Examples 5 and 6 is highly sensitive and can realize photopolymerization with high efficiency, but on the other hand, there is a problem of yellowing due to the presence of absorption in the visible region. The photopolymerization initiator (Irgacure 907) used in Formulation Example 4 does not have absorption in the visible region, but on the other hand, there is a problem of low sensitivity which, in the process, requires long exposure time and consequently lowers the productivity.

Next, a color filter was prepared in the same manner as in Example A1, except that the light scattering layer was not formed. The coating liquid for a light scattering layer prepared according to Formulation Example 4 was spin coated on the color filter substrate. The coating was dried, followed by exposure, development, and post-baking (200° C., 30 min) to form a light scattering layer. Thus, a color filter was prepared. Another color filter was prepared in the same manner as described just above, except that the coating liquid prepared according to Formulation Example 5 was used. A further color filter was prepared in the same manner as described just above, except that the coating liquid prepared according to Formulation Example 6 was used.

For the color filters thus obtained, the reflection spectral chromaticity coordinate (D65 light source) was measured in the same manner as in Example B1.

Figure 13:
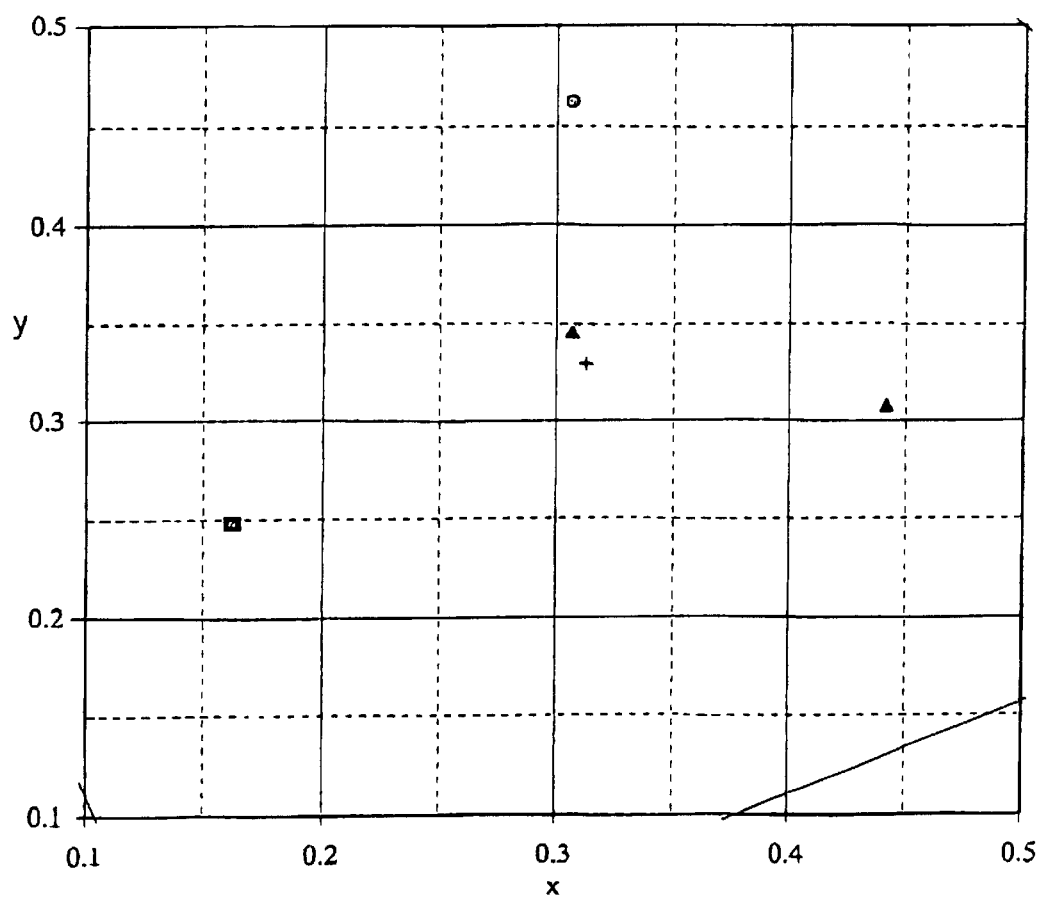
FIG. 13 is a diagram showing an example of a reflection spectral chromaticity coordinate in the case where the color filter according to the present invention is free from a coloring component which deteriorates color properties.
Figure 14:
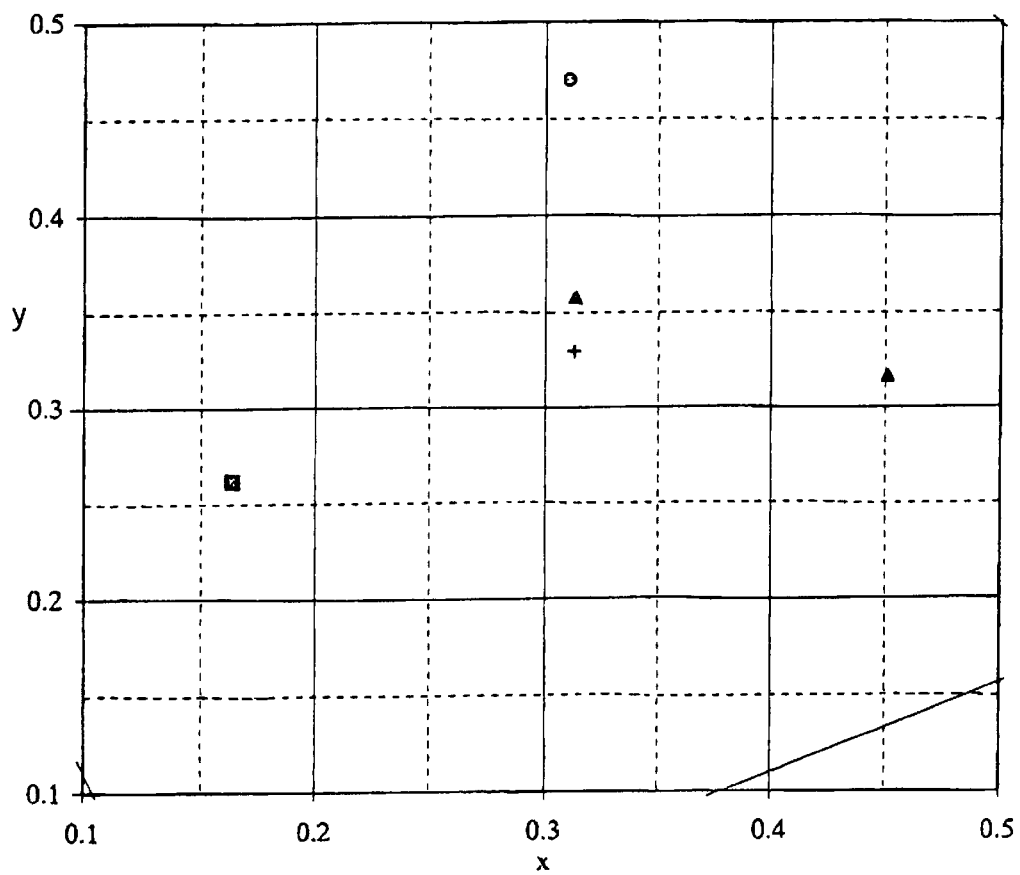
FIG. 14 is a diagram showing an example of a reflection spectral chromaticity coordinate in the case where the color filter according to the present invention contains a coloring component which deteriorates color properties.
Figure 15:
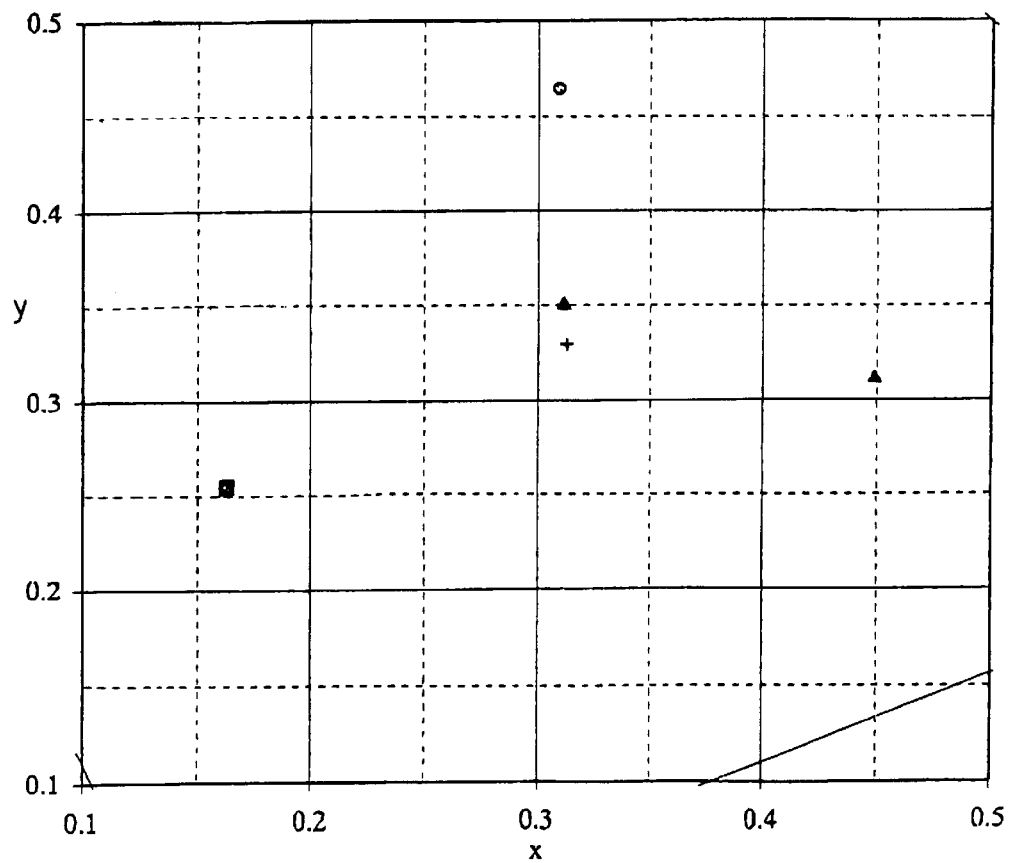
FIG. 15 is a diagram showing an example of a reflection spectral chromaticity coordinate in the case where the color filter according to the present invention contains a coloring component which deteriorates color properties and, in addition, color correction has been done by the addition of a colorant.

FIG. 13 shows the results of measurement on the color filter using the coating liquid prepared according to Formulation Example 4, FIG. 14 the results of measurement on the color filter using the coating liquid prepared according to Formulation Example 5, and FIG. 15 the results of measurement on the color filter using the coating liquid prepared according to Formulation Example 6. More specifically, FIG. 13 shows the results of measurement on the color filter using the coating liquid not containing a component (Irgacure 369) which deteriorates the color properties of the color filter according to the present invention, FIG. 14 the results of measurement on the color filter using the coating liquid containing a component (Irgacure 369) which deteriorates the color properties of the color filter according to the present invention, and FIG. 15 the results of measurement on the color filter using the coating liquid containing a coloring component, which deteriorates the color properties of the color filter according to the present invention (FIG. 13), and, in addition, containing a colorant added for color correction.

As is apparent from FIGS. 13 to 15, in the embodiment according to the present invention wherein the colorant had been added to perform color correction (FIG. 15), even when a material containing a coloring component, which deteriorates the color properties of the color filter provided with a light scattering layer, is used (FIG. 14), satisfactory color properties can be provided which are substantially comparable with those of the color filter using a material not containing any coloring component which deteriorates the color properties (FIG. 13). Therefore, the embodiment using a colorant according to the present invention can satisfactorily utilize the sensitivity of the photopolymerization initiator (in this example, Irgacure 369) without deteriorating the color properties.

What is claimed is:

1. A color filter comprising at least a substrate and a colored layer of a plurality of color patterns,
    said color filter including light scattering fine particles and colorants for correction of color properties with the proviso that said colorants are not in said colored layer, said color filter having a haze of 10 to 90, said light scattering fine particles having an average particle diameter of not more than 2.0 µm and being included in one or more layers having a total thickness of 0.5 to 20 µm.

2. The color filter according to claim 1, wherein the substrate is transparent and which further comprises a transparent electrode layer stacked on the colored layer in its surface remote from the substrate,
    the light scattering fine particles being included as a light scattering layer between the transparent substrate and the colored layer.

3. A liquid crystal display device comprising:
    the color filter according to claim 2;
    an electrode substrate comprising a transparent substrate and, stacked on the transparent substrate in the following order, a driving element layer, a reflective electrode layer, and a transparent electrode layer, light scattering fine particles being included as a light scattering layer between the reflective electrode layer and the transparent electrode layer; and
    a liquid crystal layer sandwiched between the color filter and the electrode substrate.

4. The color filter according to claim 1, wherein the substrate is transparent and which further comprises a transparent electrode layer stacked on the colored layer in its surface remote from the substrate,
    the light scattering fine particles being contained in the colored layer.

5. The color filter according to claim 1, wherein the substrate is transparent and which further comprises a flattening layer stacked on the colored layer in its surface remote from the substrate and a transparent electrode layer stacked on the flattening layer in its surface remote from the colored layer,
    the light scattering fine particles being contained in the flattening layer.

6. The color filter according to claim 1, wherein a laminate of a driving element layer and a reflective electrode layer is additionally provided between the substrate and the colored layer in such a manner that the driving element layer is stacked on the substrate and the reflective electrode layer is stacked on the driving element layer,
    the light scattering fine particles being included as a light scattering layer between the reflective electrode layer and the colored layer.

7. A liquid crystal display device comprising:
    the color filter according to claim 6;
    a display-side substrate comprising a transparent electrode layer stacked on a transparent substrate, light scattering fine particles being included as a light scattering layer between the transparent substrate and the transparent electrode layer; and
    a liquid crystal layer sandwiched between the color filter and the display-side substrate.

8. The color filter according to claim 1, wherein a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being contained in the colored layer.

9. The color filter according to claim 1, which further comprises a flattening layer stacked on the colored layer in its surface remote from the substrate and wherein a laminate of a driving element layer and a reflective electrode layer is provided between the substrate and the colored layer in such a manner that the driving element layer is stacked on the substrate and the reflective electrode layer is stacked on the driving element layer, the light scattering fine particles being contained in the flattening layer.

10. The color filter according to claim 1, wherein the substrate is transparent and which further comprises a transparent electrode layer stacked on the colored layer in its surface remote from the substrate, the light scattering fine particles being included as a light scattering layer between the transparent substrate and the colored layer and being further contained in at least one of the color patterns.

11. The color filter according to claim 1, wherein the substrate is transparent and which further comprises a flattening layer stacked on the colored layer in its surface remote from the substrate and a transparent electrode layer stacked on the flattening layer in its surface remote from the colored layer, the light scattering fine particles being contained in the flattening layer and at least one of the color patterns.

12. The color filter according to claim 1, wherein the substrate is transparent and which further comprises a flattening layer stacked on the colored layer in its surface remote from the substrate and a transparent electrode layer stacked on the flattening layer in its surface remote from the colored layer, the light scattering fine particles being included as a light scattering layer between the transparent substrate and the colored layer and being further contained in the flattening layer.

13. The color filter according to claim 1, wherein a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being included as a light scattering layer between the reflective electrode layer and the colored layer and being further contained in at least one of the colored patterns.

14. The color filter according to claim 1, which further comprises a flattening layer stacked on the colored layer in its surface remote from the substrate and wherein a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being contained in the flattening layer and, in addition, in at least one of the color patterns.

15. The color filter according to claim 1, which further comprises a flattening layer stacked on the colored layer in its surface remote from the substrate and wherein a laminate of a driving element layer and a reflective electrode layer is additionally provided between the substrate and the colored layer in such a manner that the driving element layer is stacked on the substrate and the reflective electrode layer is stacked on the driving element layer, the light scattering fine particles being included as a light scattering layer between the reflective electrode layer and the colored layer and being further contained in the flattening layer.

16. The color filter according to claim 1, wherein the colorants are organic or inorganic pigments.

17. The color filter according to claim 1, wherein the colorants are dyes.

18. The color filter according to claim 1, wherein the colorants are combinations of organic or inorganic pigments with dyes.

19. The color filter according to claim 1, wherein the light scattering fine particles have an average particle diameter of 0.1 to 1.0 $\mu$m.

* * * * *